(12) United States Patent
Naito et al.

(10) Patent No.: US 6,925,603 B1
(45) Date of Patent: Aug. 2, 2005

(54) APPARATUS AND METHOD FOR PRESENTING SCHEDULE INFORMATION DEPENDING ON SITUATION

(75) Inventors: Hirohisa Naito, Kawasaki (JP); Kuniharu Takayama, Kawasaki (JP); Minoru Sekiguchi, Kawasaki (JP); Yoshiharu Maeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 814 days.

(21) Appl. No.: 09/654,524

(22) Filed: Sep. 1, 2000

(30) Foreign Application Priority Data

Sep. 27, 1999 (JP) .......................................... 11-271916

(51) Int. Cl.⁷ ............................. G06F 3/00; G06F 17/60
(52) U.S. Cl. ...................... 715/733; 715/963; 715/760; 705/9
(58) Field of Search ................................ 345/963, 733, 345/760, 751, 744, 745, 747, 864, 962; 705/9, 7, 8, 14, 26, 27; 701/200, 206, 207, 208, 213; 340/990, 989, 995

(56) References Cited

U.S. PATENT DOCUMENTS

| | | | | |
|---|---|---|---|---|
| 4,819,191 A | * | 4/1989 | Scully et al. | 345/751 |
| 5,541,845 A | | 7/1996 | Klein | 364/449 |
| 5,610,822 A | | 3/1997 | Murphy | 364/449.5 |
| 5,790,974 A | * | 8/1998 | Tognazzini | 701/207 X |
| 5,842,009 A | * | 11/1998 | Borovoy et al. | 345/963 X |
| 5,938,721 A | | 8/1999 | Dussell et al. | 701/211 |
| 6,064,975 A | * | 5/2000 | Moon et al. | 705/8 |
| 6,141,005 A | * | 10/2000 | Hetherington et al. | 345/963 X |
| 6,549,939 B1 | * | 4/2003 | Ford et al. | 705/8 X |

FOREIGN PATENT DOCUMENTS

| | | | | |
|---|---|---|---|---|
| JP | 07-209451 | | 8/1995 | |
| JP | 09113599 A | | 5/1997 | G01S/5/14 |
| JP | A-10-187852 | | 7/1998 | |
| WO | 99/38079 | | 7/1999 | |

OTHER PUBLICATIONS

Japanese Patent & Trademark Office; Office Action; Mar. 4, 2003.
Minoru Sekiguchi et al., NaVigation Markup Language (NVML) W3C Note; Aug. 6, 1999.
Office Action from Japanese Patent Office.
Minoru Sekiguchi et al., "NaVigation Markup Language (NVML)", Internet Document, 'Online!, Aug. 6, 1999, XP002297512, Retrieved from the Internet: URL:http://www.w3:org/TR/NVML>'retrieved on Sep.21, 2004! * the whole document*.

* cited by examiner

Primary Examiner—Raymond J. Bayerl
(74) Attorney, Agent, or Firm—Staas & Halsey

(57) ABSTRACT

Schedule data described using a sequence of a predetermined specification based on a set of a place condition and a time condition, and a schedule to be performed based on the place condition and time condition is processed depending on a range of a place information and a range of a time information to be presented to a user, and information corresponding to the schedule is presented to the user.

26 Claims, 18 Drawing Sheets

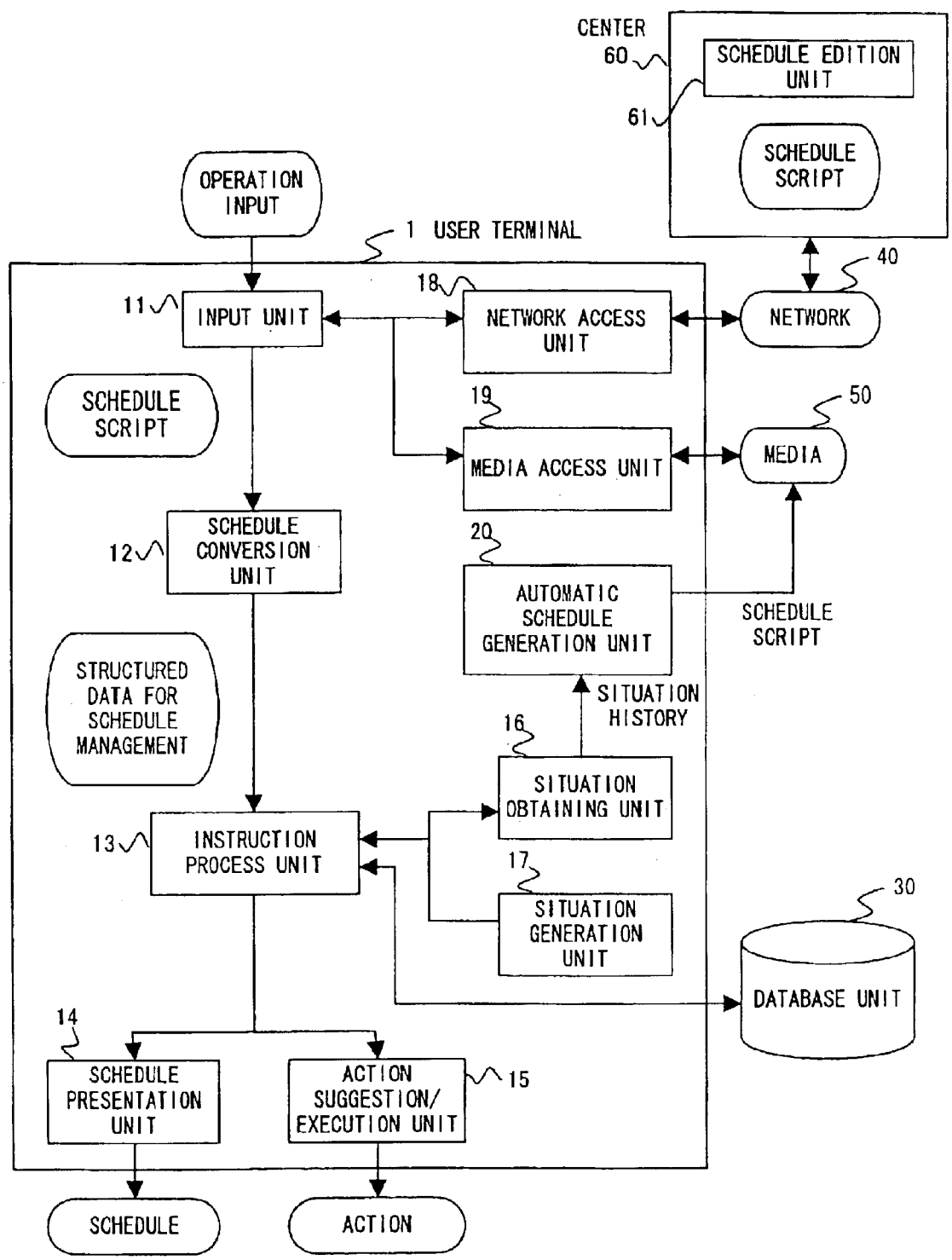
F I G. 1

| TIME | PLACE | SCHEDULE | PRESENTATION CONDITION | FORM | PRESENTATION CONTENTS |
|---|---|---|---|---|---|
| 10:00 - 18:00 once | TOKYO STATION | BUYING "NINGYOUYAKI" SPECIFIC TO TOKYO | | TEXT | BUYING "NINGYOUYAKI" SPECIFIC TO TOKYO |
| | | | | IMAGE | tokyo-station.gif |
| | TOKYO NANAESU BOOK CENTER | BUYING BOOK △△ | area=200m | TEXT | BUYING BOOK △△ |
| | | | | IMAGE | nanaesubookcenter-map.gif |
| 11:00 - 12:00 continue | | MEETING AT COMPANY A (IN SHINJUKU) | delay=-30min | ALARM | |
| | | | | TEXT | MEETING AT COMPANY A IN SHINJUKU 30 MINUTES LATER |
| | | | | VOICE | MEETING AT COMPANY A IN SHINJUKU 30 MINUTES LATER |
| | | | | IMAGE | MAP TO COMPANY A.gif |
| | | | delay=-5min | TEXT | MEETING AT COMPANY A IN SHINJUKU 5 MINUTES LATER |
| | | | | VOICE | MEETING AT COMPANY A IN SHINJUKU 5 MINUTES LATER |
| | | | | IMAGE | BUILDING OF COMPANY A.gif |
| 15:00 - 17:00 continue | | CONFERENCE (OFFICE) | delay=-30min | ALARM | |
| | | | | TEXT | CONFERENCE IN OFFICE 30 MINUTES LATER |
| | | | delay=-5min | ALARM | |
| | | | | TEXT | IF YOU CANNOT BE IN TIME, MAKE A CALL. |
| | SHINJUKU | BUYING FILM | | ALARM | |
| | | | | TEXT | BUYING FILM |
| 12:00 - 13:00 once | GINZA | GOING TO TOPICAL RESTAURANT X | | ALARM | |
| | | | | TEXT | GOING TO TOPICAL RESTAURANT X |

F I G. 2

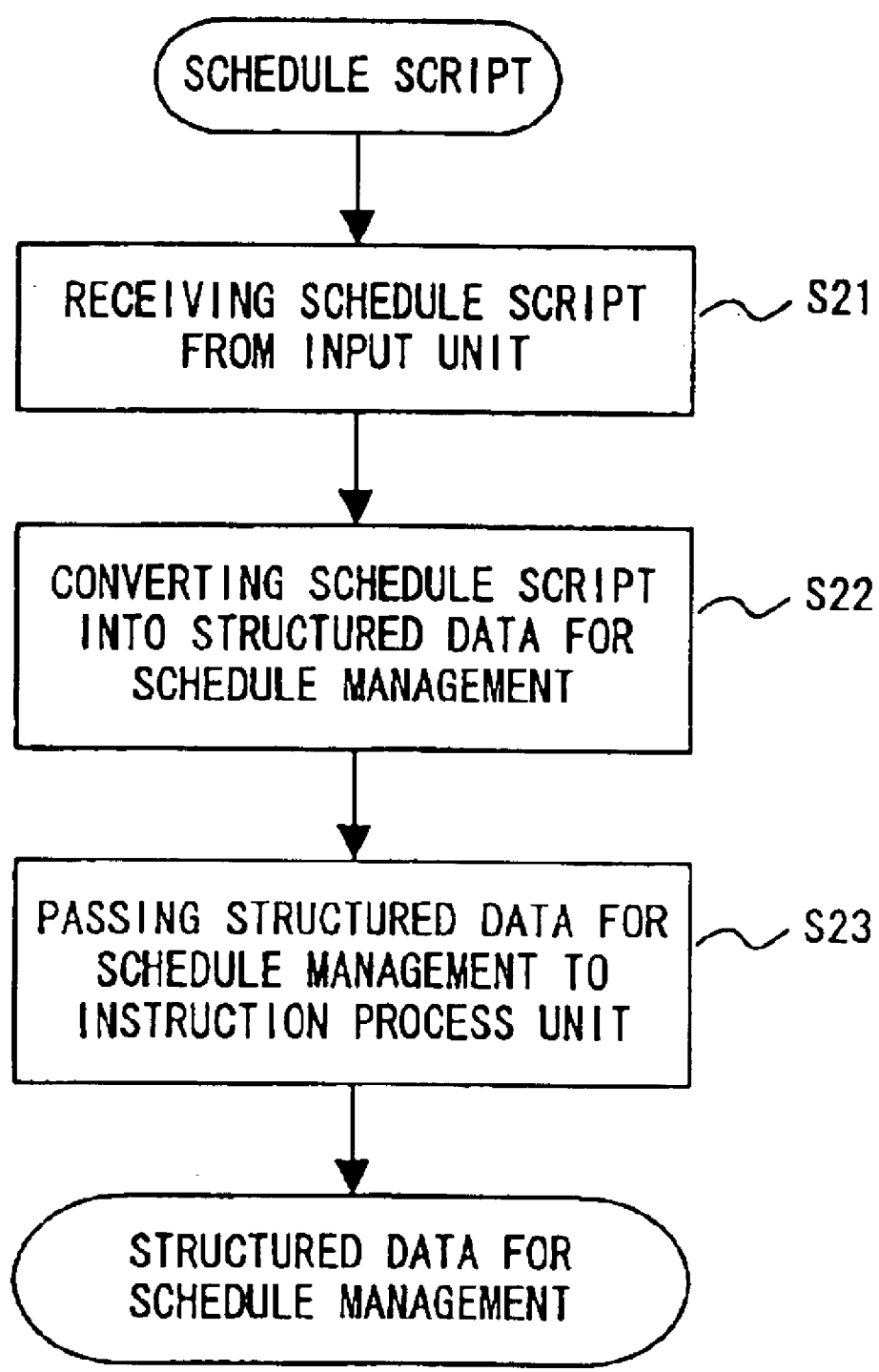
F I G. 4

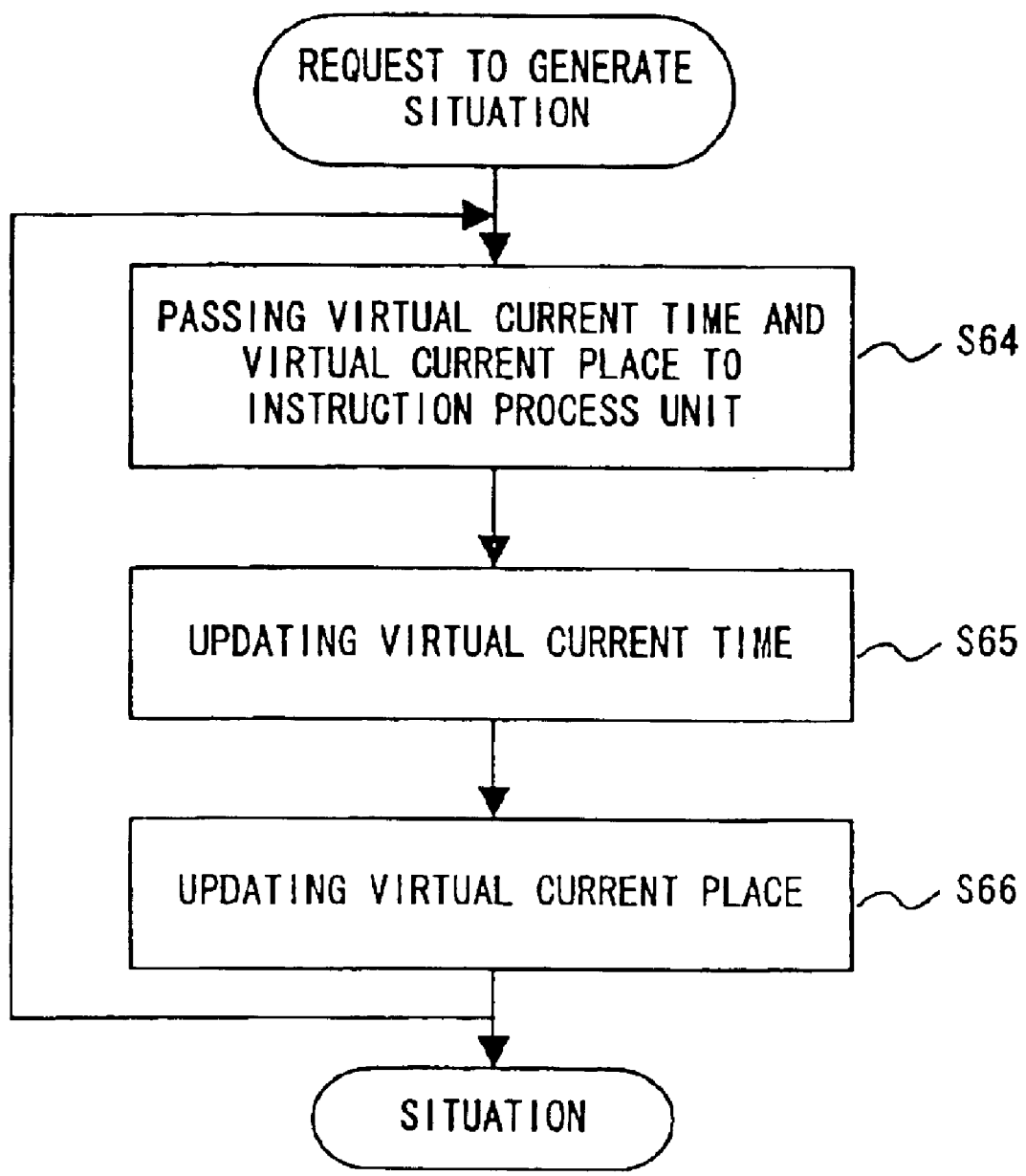
F I G. 9

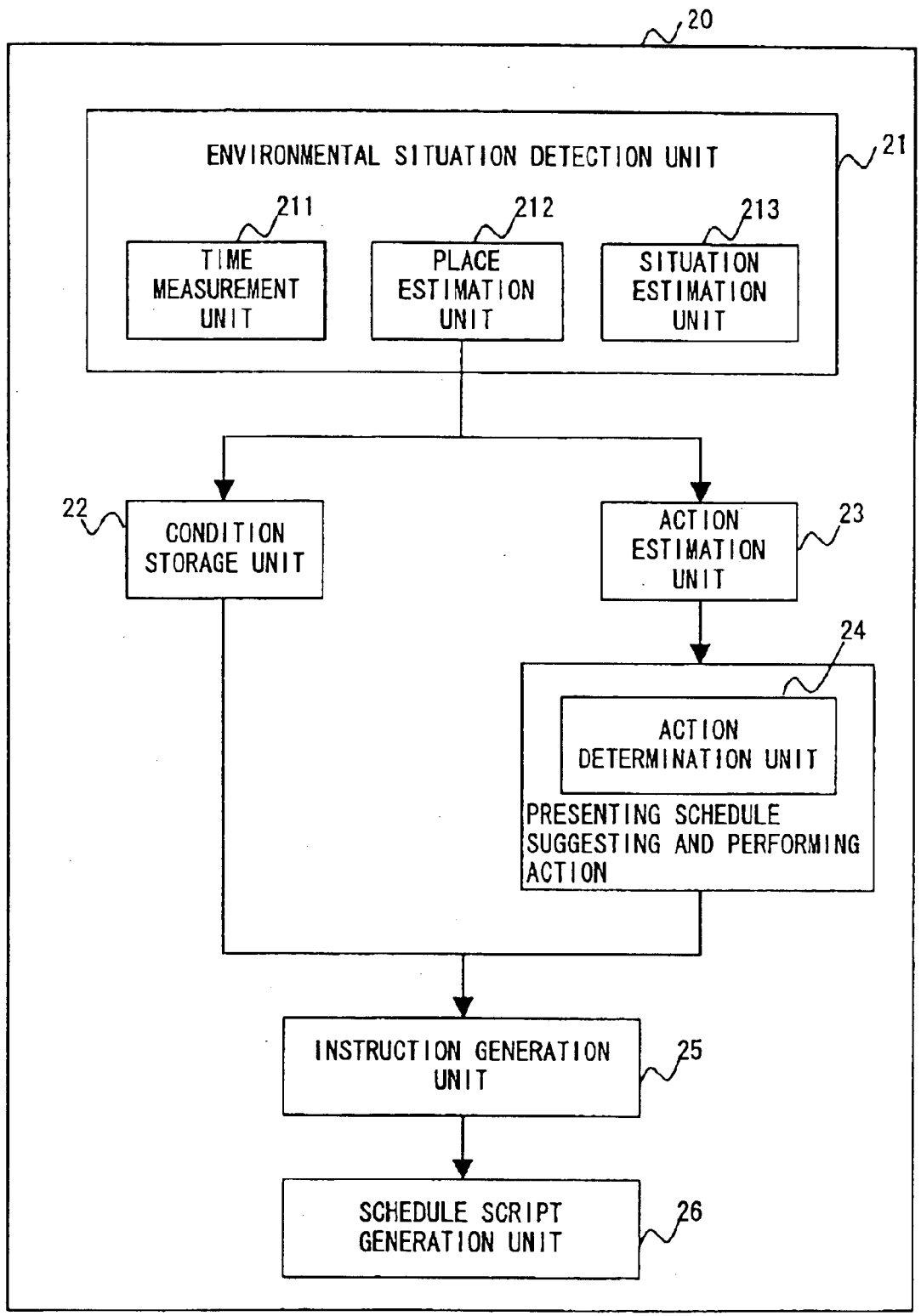
F I G. 1 2

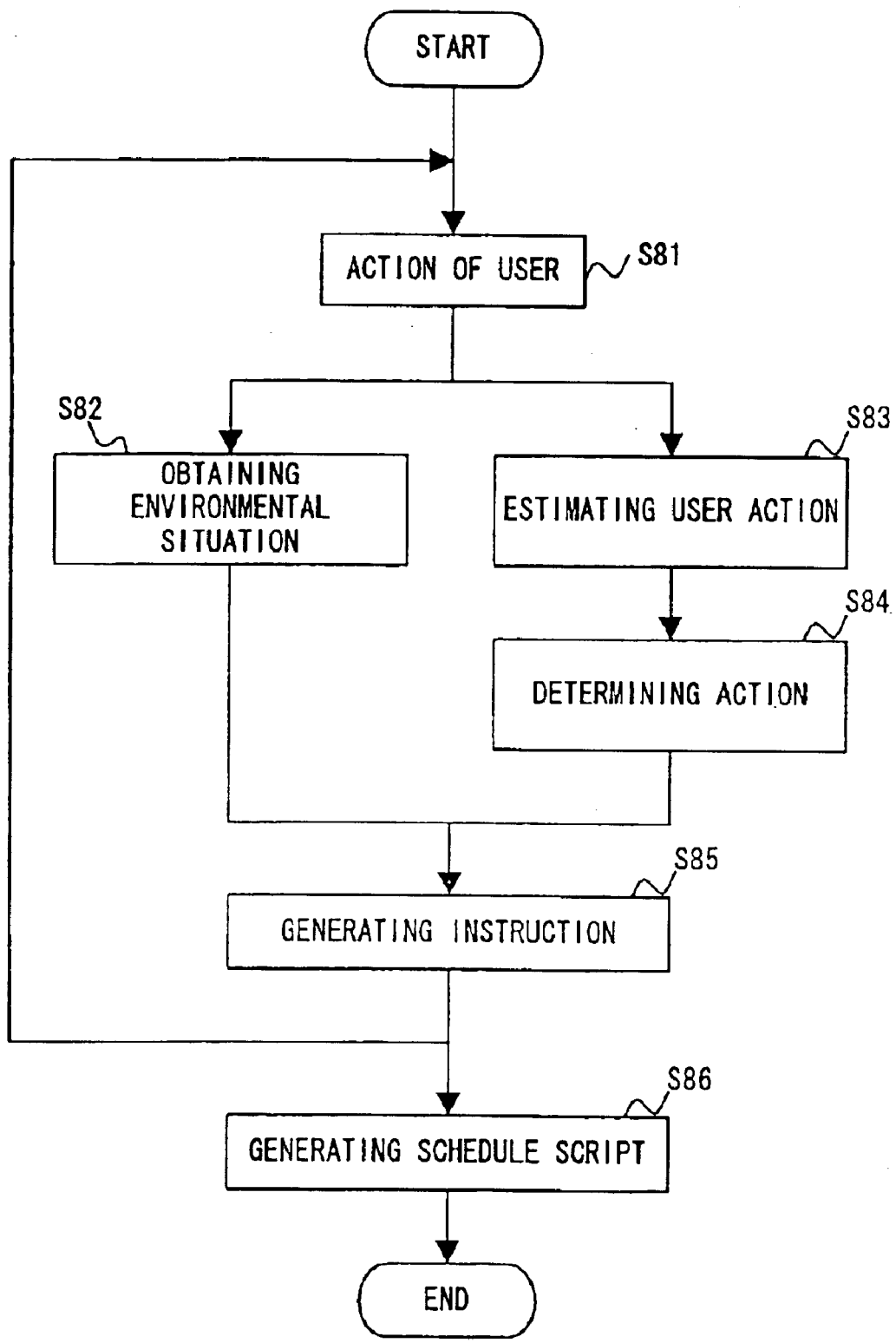
F I G. 13

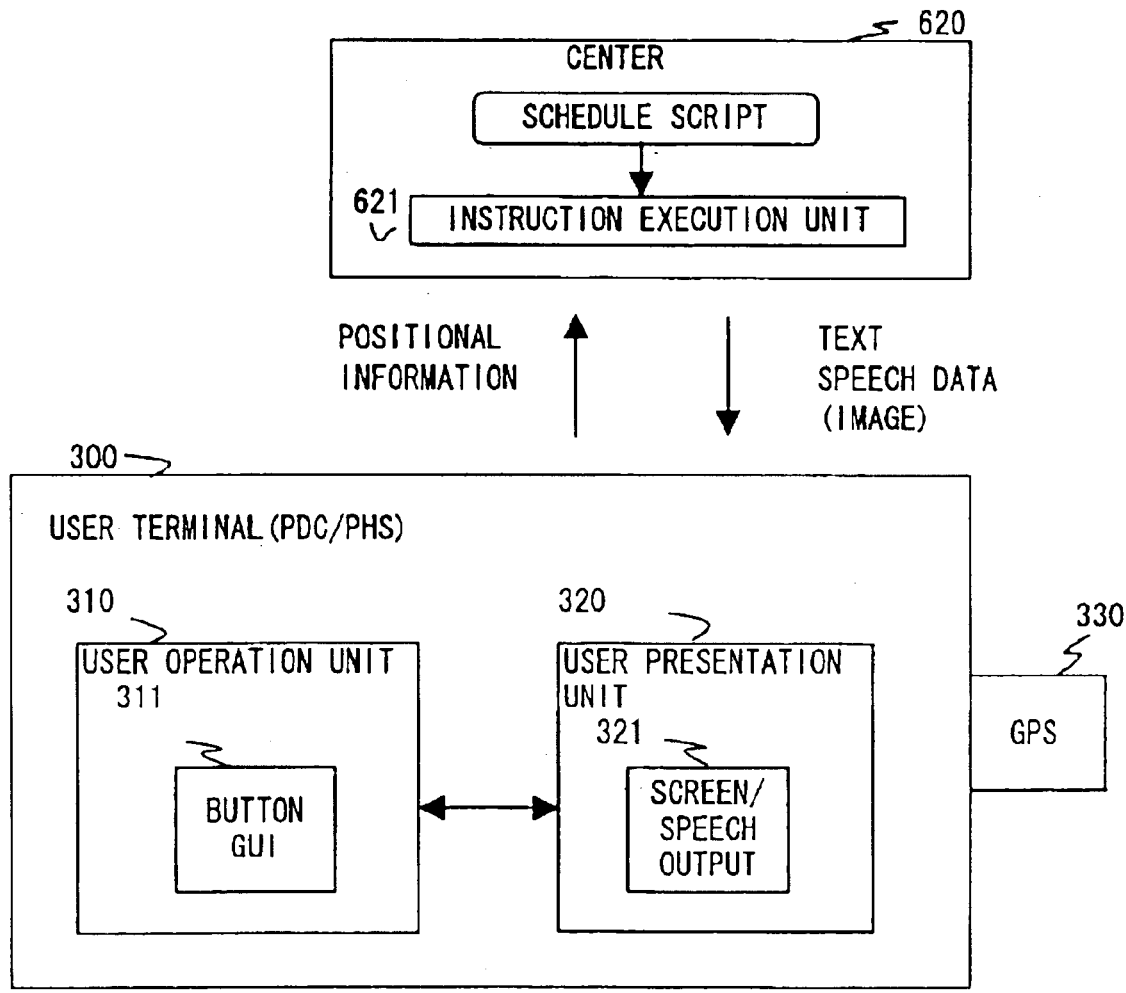
F I G. 1 6

APPARATUS AND METHOD FOR PRESENTING SCHEDULE INFORMATION DEPENDING ON SITUATION

BACKGROUND OF THE INVENTION

1. Field of the Invention

The present invention relates to an apparatus and a method of presenting a schedule, suggesting and performing an action depending on the schedule, a storage medium storing a program for the process performed for the apparatus and the method, a schedule storage medium, and an automatic schedule generation apparatus, and provides a method of presenting a user with information and action according to a scheduling method and the schedule. Specifically, the present invention relates to a technology of applying to a car navigation system, a personal computer (hereinafter referred to as a PC), a PDA (personal digital assistant), a cellular phone, etc. for use in managing a schedule and supporting actions, etc.

2. Description of the Related Art

There is a conventional schedule managing method for managing a schedule based on a time axis. In addition, there is an action support system for indicating a schedule on time or before the time when the schedule is carried out by storing the schedule on a schedule note.

In the above mentioned conventional schedule management, a schedule is managed based on time. On the other hand, there is a portable terminal system for notifying whether or not there is an action to be taken by a user by managing a schedule of the user for each place, not based on time (Japanese Patent Application Publication No. 9-113599). In this system, the current positional information about the portable terminal system is obtained, the place-action information in which an action to be taken by a user is entered for each place is referred to, and the user is notified of the action to be taken at each place when he or she approaches or exits the place entered in the information.

However, there have been the following problems with the conventional schedule management system based on the place information such as the above mentioned Japanese Patent Application Publication No. 9-113599.

(1) There are a number of applications in which it is convenient to be informed of the schedule of a user. However, since a schedule is managed in a data format depending on applications according to the conventional systems, it is difficult for a user to generate schedule data in an external device using, for example, a general-purpose editor, etc., input the generated data into a portable terminal system, and utilize the data. Furthermore, there has been the problem that schedule information cannot be appropriately shared among various applications.

(2) In addition, since the conventional systems manage a schedule in a data format depending on applications, it is difficult to understand the contents of the schedule only by checking a data string representing the schedule, and to centrally manage the schedule data as a database by an information center.

(3) When a conventional device which manages a schedule according to place information arrives at a place entered in advance in place-action information, the device only notifies the user of the existence of an action to be taken at the place, but cannot adjust (specify) the type or the timing of announcement. Furthermore, the device does not have the function of automatically executing a schedule by, for example, transmitting electronic mail.

(4) When a conventional device which manages a schedule according to place information does not arrive at a place entered in advance in place-action information, the device does not notify the user of the existence of an action to be taken at the place. Therefore, the device does not have the function of performing an operation as if it were visiting a place without actually visiting the place and allowing the user to have a virtual experience or a pseudo experience.

(5) In addition, with the conventional device, a schedule is close to an owner of a portable terminal system, and new schedule data such as a common model schedule has not been utilized.

(6) Furthermore, with the conventional device, a schedule is entered as place-action information. Therefore, an owner of a portable terminal system has to input data each time, and the device does not have the function of automatically generating a schedule depending on the action of a user.

SUMMARY OF THE INVENTION

The present invention has been developed to solve the above mentioned problems, aims at providing an apparatus capable of managing a schedule based not only on time, but also on a combination of time and place, presenting information for the schedule management of a user, and suggesting/performing an action at an appropriate time and place. In addition, the present invention aims at providing an apparatus capable of describing a schedule in time and place in a common format, specifying a timing and a presenting method for issuing a schedule, and sharing schedule information among various systems. Furthermore, the present invention aims at providing an apparatus capable of automatically generating a schedule depending on the action of a user.

The schedule presentation apparatus according to the present invention includes an input device, a process device, a situation device, and an execution device, and provides a user with information corresponding to a schedule.

According to the first aspect of the present invention, the input device inputs data containing a sequence of predetermined specifications described by a combination of a place condition, a time condition, and a schedule to be performed based on the place condition and the time condition. The process device processes the schedule described in the input data depending on the ranges of place information and time information presented to a user.

According to the second aspect of the present invention, the input device inputs data containing a sequence of predetermined specifications described by a combination of a place condition, a time condition, a schedule to be performed based on the place condition and the time condition, presented information for the schedule to a user, and a method of presenting the information. The process device processes at least one of the schedule and the presented information for the schedule described in the input data depending on the ranges of place information and time information presented to the user.

According to the third aspect of the present invention, the input device inputs data containing a sequence of predetermined specifications described by a combination of a place condition, a time condition, a schedule to be performed based on the place condition and the time condition, presented information for the schedule to a user, and a method of presenting the information. The situation device either obtains a situation of the current place and the current time or generates a situation of a virtual current place and a virtual current time. The process device processes at least one of the schedule and the presented information for the schedule described in the input data depending on the current place and the current time obtained by either obtaining or generating the situation.

According to the fourth aspect of the present invention, the input device inputs data containing a sequence of predetermined specifications described by a combination of a place condition, a time condition, a schedule to be performed based on the place condition and the time condition, presented information for the schedule to a user, a method of presenting the information, and an action to be taken for the schedule. The situation device either obtains a situation of the current place and the current time or generates a situation of a virtual current place and a virtual current time. The process device processes at least one of the schedule and the presented information for the schedule described in the input data depending on the current place and the current time obtained by either obtaining or generating the situation. The execution device performs the action to be taken for the schedule described in the input data depending on the current place and the current time obtained by either obtaining or generating the situation.

Furthermore, the schedule presentation apparatus according to the present invention can display a schedule with a place condition in the display range of a map, and control the presenting process by a combination of a time condition and a place condition.

BRIEF DESCRIPTION OF THE DRAWINGS

FIG. 1 shows an example of the configuration of the present invention;

FIG. 2 shows an example of the structured data for schedule management;

FIG. 4 shows a flow of the process of the schedule conversion unit;

FIG. 9 shows a flow of the situation generating process of the situation generation unit;

FIG. 12 shows an example of the configuration of the automatic schedule generation unit;

FIG. 13 shows a flow of the process of the automatic schedule generation unit;

FIG. 16 shows an example of the configuration of the system when the present invention is applied to a cellular phone/PHS;

DESCRIPTION OF THE PREFERRED EMBODIMENTS

Figure 3:
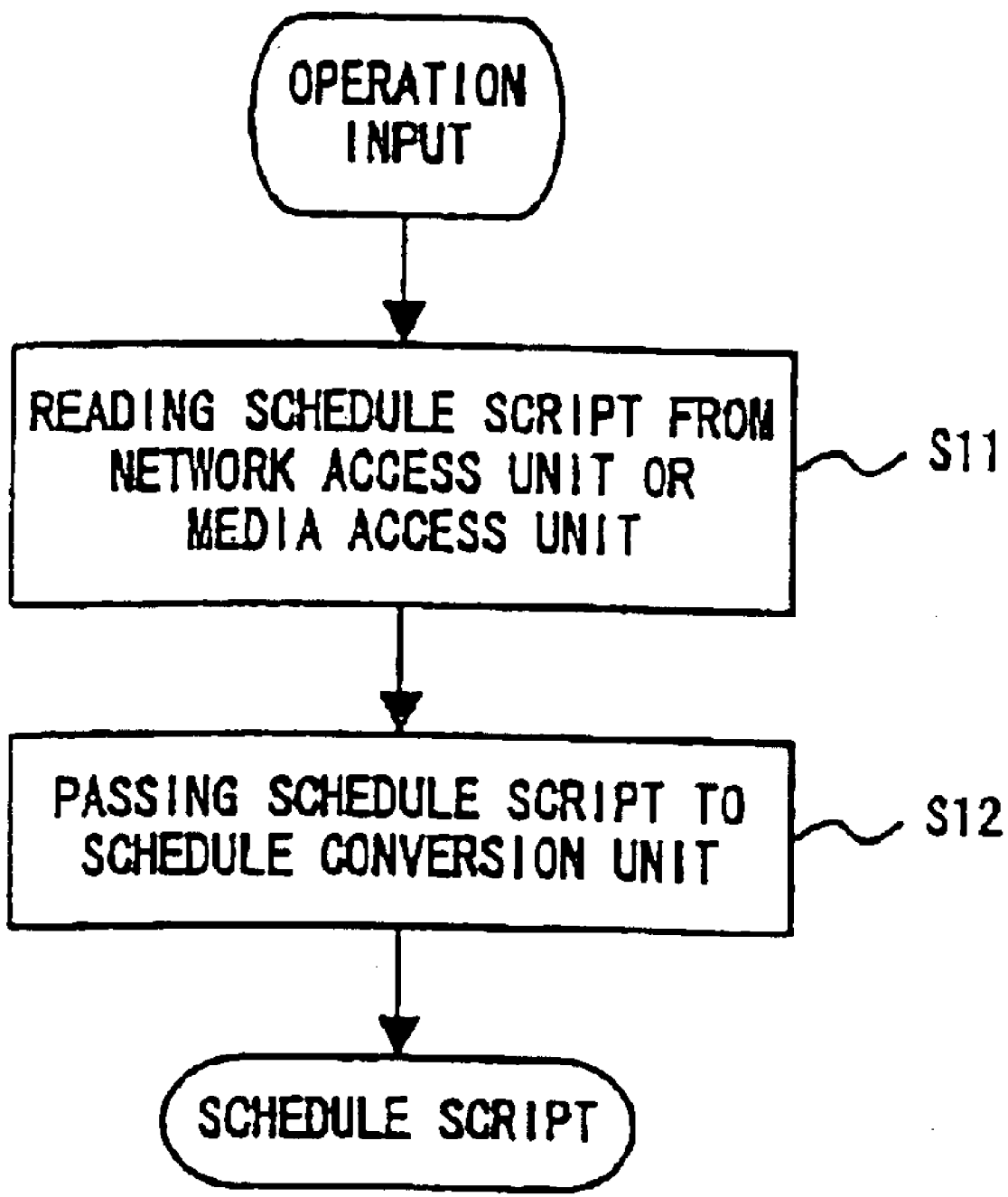
FIG. 3 shows a flow of the process of the input unit.

The embodiments of the present invention are described below by referring to the attached drawings.

Before explaining the units for realizing the present invention, some examples of uses of the present invention are briefly described below for easy comprehension of the present invention.

(1) Example of the Management of a Schedule Entered by a User

A user first describes his or her own schedule on a scheduler. At this time, the schedule containing not only a time, but also a combination of a time and a place can be described. For example, the following schedule can be described.

10:00 Meeting

Near a camera shop: Buy a roll of film

In Shinjuku at lunch time: Visit the shop A having a good reputation

The scheduler stores the description, and presents schedule information when a condition is satisfied. That is, when a user comes near a camera shop, the message such as 'Buy a roll of film.' is issued to the user. Since the schedule information is described in a predetermined script language in which time information, the place information, the presented information, and the action execution information can be described, the information can be available without limiting the application to specific portable information appliances.

(2) Example of a Combination with an Event Schedule, and an Adjustment with Schedules of Others such as Friends, Colleagues, etc.

Since the method of describing a schedule can be set in the same format for the data of a user's personal schedule, the data from an information service center, etc. such as event information, etc., the data generated by a friend, a colleague, etc., the data of a user's personal schedule can be combined with the data of a schedule such as an event, etc., the data of a friend, a colleague, etc. to easily generate a new schedule plan.

First, a schedule containing a work schedule of a company and a private schedule is prepared as a personal schedule, and then the type, etc. of event information desired by a user such as 'movies', 'sports', etc. is specified. A scheduler automatically downloads the event information in the user-specified field in the event schedule stored in the server of the information service center, and automatically inserts the information to the user schedule script. Thus, the scheduler can present a schedule without missing a favorite sports program, and automatically suggest a place to be visited for fun (for example, a movie theater) when a user is free.

When a user has to share an activity with a friend or a colleague, each person has to find a common free day and time. This also can be adjusted with a common format.

(3) An example of Control by a Life Pattern Format

A number of model schedules containing various living models with occupations and environments taken into account A user downloads the model schedules, executes any of the schedules, and experiences the life pattern according to the schedule.

Some model schedules are described below.

talent life schedule: for a user who wants to experience the life of talent schedule for passing an exam of Tokyo University: for passing an exam of Tokyo University by following the schedule schedule recommended by Ministry of Welfare: for a user who lives an irregular life, and wants to live a normal life training schedule for selected football team of Japan: for boy football players who want to enter the selected team of Japan According to the above listed model schedules, a user can follow one of the model schedules, compare his or her own life with the life of his or her idol, share the feeling of the idol, and enjoy the pseudo experience. In addition, for example, a schedule recommended by the Ministry of Welfare to check the daily life of a user and improve his or her own life to live a healthy life. These models can be a one-day model, a one-week model, a one-month model, a one-year model, or a life model.

Therefore, the present invention includes a method of describing a schedule at least about 'a time and a place', and a schedule management system which can process the schedule depending on 'a time and a place'. The schedule management system includes a device for inputting a schedule, a device for executing an instruction, and a device for suggesting a schedule and performing an action.

The device for inputting a schedule inputs a schedule specified by a user by communicating the schedule with an external device which provides the schedule through a network, or by reading it from a computer-readable electronic medium.

The device for executing an instruction analyzes an input schedule, converts it into a data structured in a hierarchical and group form for schedule management, and executes an instruction represented in a structured data format depending on a condition.

The device for presenting a user with a schedule, or suggesting and performing a necessary action presents a corresponding schedule, suggests or performs a necessary action at each place or time, at a specific time and place, or depending on an external event such as a user input operation, a user specified action, etc. for all or a part of the schedule.

As an operation mode of the apparatus according to the present invention, a real mode or a simulation mode can be selected. In the real mode, an instruction is executed depending on the condition of the actual current time and the actual current place. In the simulation mode, it is executed depending on condition of the virtual current time and the virtual current place. Thus, a schedule is presented to a user, and a necessary action is suggested or performed.

A program for realizing each of the above mentioned process devices can be stored in an appropriate storage medium such as computer-readable portable medium memory, semiconductor memory, a hard disk, etc. In addition, a schedule can also be stored in portable medium memory such as a computer-readable magnetic disk, an optical disk, an IC card, and an appropriate storage medium such as a hard disk, etc., and can be recorded as a printed bar code.

The schedule used in the present invention can be generated and edited by a normal text editor. In addition, it can be semi-automatically or automatically generated using the history of the time and the positional information obtained when an action is actually performed.

Thus, the feature of the method of describing a schedule relating to the 'time and place' according to the present invention resides in that a sequence of instructions of a schedule depending on a time and a place is described in a language based on a designated specification, easily read and written by a user, generated, presented, and used in a common format by various devices, and easily copied.

To this schedule, a schedule about a time and a place, the information to be presented to a user and the output format at the time so that a schedule can be presented to a user at a necessary time and place depending on the schedule, and a necessary action can be suggested and performed. Furthermore, a schedule can be communicated between a center and a client, or between terminal units to generate or edit a schedule suitable for a user.

FIG. 1 is a block diagram of an example of the configuration of the apparatus according to the present invention. According to the present invention, a sequence of instructions for each time and place recorded in various formats is described in a predetermined descriptive language comprehensible to a user and computer. FIG. 1 shows an example in which a markup language is used in describing a schedule.

An instruction refers to a section of a process in which one of schedules about a time and a place is presented to a user, or a necessary action is suggested and performed. For example, it can be 'When a meeting is scheduled to be held at 10:00, it is announced 10 minutes before the start of the meeting', When a user has a schedule that he or she takes Shinkansen at 11:00, and when the user will be late for the train because the user is now on a local train, the user is suggested to transfer into an express train', etc. That is, it is a combination of a schedule and a description as to what action is to be taken by a user relating to the schedule.

Such a sequence of instructions is described in a description format of a markup language such as an XML (eXtensible Markup Language), and is referred to as a schedule script or simply as a schedule.

A schedule script is stored and managed in a center 60, or stored in various media 50 such as a magnetic disk, CD-ROM, etc., and read from a user terminal 1.

An input unit 11 of each user terminal 1 selects and reads information corresponding to an operation input such as a request from a user, from the schedule script stored in the center 60 through the network access unit 18, or from the schedule script stored in the media 50 through the media access unit 19, and passes it to a schedule conversion unit 12. When the schedule management is constantly performed, the schedule always exists in the schedule conversion unit 12.

The schedule conversion unit 12 analyzes the syntax of the schedule script received from the input unit 11, and converts it into structured data for easy schedule management. There can be a function, provided in the schedule conversion unit 12, of checking whether or not an inconsistent schedule exists, and removing it if it actually exists. When an instruction process unit 13 directly reads and processes the corresponding portion of the schedule script, the schedule conversion unit 12 is not required.

The instruction process unit 13 obtains the current situation (the current place, the current time, etc.) of the user, and executes an instruction for a corresponding schedule. When the instruction is executed, the execution timing can be shifted by an attribute such as 'delay', etc. The type of instruction can refer to representing a schedule to a user by a schedule presentation unit 14, or suggesting or performing a necessary action by an action suggestion/execution unit 15. The current situation of the user can be obtained from a situation obtaining unit 16 in a real mode, and from a situation generation unit 17 in a simulation mode.

A schedule script is obtained by describing a sequence of the instructions of a schedule corresponding to the time and the place using a tag in the description format of a markup language. A generated schedule script can be as easily read and written as the existing markup language, thereby easily retrieved and processed. In addition, a schedule script enables instructions to be rearranged, serialized, parallelized, and optimized, and data to be structured (in a hierarchical structure, in a group, etc.). Since schedules relating to various times and places can be described and corresponding processes can be set using the schedule script, schedules can be easily generated and managed.

Furthermore, since a schedule script is basically text data, a schedule script obtained from the center 60, etc. can be processed depending on the user's terminal, and one schedule script can be processed in various devices and systems. For example, the schedule of a day can be confirmed by a personal computer in the office of the user, and is processed by a car navigation system when the user moves in a car. When the user get off the car and is visiting a customer, schedule information is presented through a portable phone and a PDA. These processes are performed by transmitting and receiving one schedule file.

When a schedule script is stored in the center 60, the data of the schedule script can be downloaded from the center 60 each time an appliance for presenting a schedule is changed. In addition, without the center 60, the schedule management can continue only by transmitting and receiving the data of the schedule script through a storage medium, infrared communications, etc.

On the other hand, since a schedule can be managed according to instructions, the contents of a process is clearly indicated, and can be easily changed. Furthermore, a schedule can be presented and an action can be suggested and taken based on the situation at an appropriate timing.

In addition, it is possible for a user to virtually experience a schedule in a simulation mode. For example, a user can experience the schedule of talent with the time sped up, etc.

Thus, a schedule script can be easily generated and edited using the existing text editor, etc., and the generated schedule script can be provided as a center service. Therefore, a user can obtain various schedule information at any location through a network.

<Generating and Editing a Schedule Script>

Described below is the process of generating and editing a schedule script. Since a schedule script can be described in a markup language, it can be edited by a normal text editor, and can also be easily generated and edited by generating the schedule script through a GUI (graphical user interface) using a map, a calendar, a time schedule table.

A method of generating and editing a schedule script can be realized using the technology disclosed by, for example, Japanese Patent Application No. 11-113191 'GUIDANCE INFORMATION PRESENTATION APPARATUS, GUIDANCE INFORMATION PRESENTING METHOD, STORAGE MEDIUM STORING GUIDANCE INFORMATION PRESENTATION PROGRAM, STORAGE MEDIUM FOR GUIDING SCRIPT, GUIDING SCRIPT GENERATION APPARATUS, OPERATION MANAGEMENT APPARATUS, METHOD, AND STORAGE MEDIUM THEREFOR USING GUIDING SCRIPT, MOBILE TIME ADJUSTMENT APPARATUS, METHOD, AND PROGRAM STORAGE MEDIUM THEREFOR USING GUIDANCE SCRIPT, GUIDE PLAN GENERATION APPARATUS, METHOD, AND PROGRAM STORAGE MEDIUM THEREFOR, GUIDE INFORMATION PRESENTATION APPARATUS, METHOD, AND PROGRAM STORAGE MEDIUM THEREFOR'. Especially, in an example of a process described by referring to FIGS. 33 thorough 37 relating to the application, the information attached to map data, etc. can be schedule information instead of guide information. Practically, in setting a schedule corresponding to a place, facility objects in a map such as buildings, roads, etc. on the display screen of a map are specified by a user using a pointing device such as a mouse, etc., and selected schedule information is attached to the pointed position with schedule information, a menu, etc. which are input with text on a small memo screen. Furthermore, on a day and time display screen as a calendar, a schedule table, etc., the time information about year/month/day, time, period, etc. is specified using a pointing device.

In addition, when the name of a place is directly input and specified, candidates are retrieved from a database for the contents of the user input and presented to the user so that the user can select one of them and avoid obscure specification of a place. Furthermore, as described later, a device for automatically generating a schedule script can be provided.

<Outline of Schedule Script>

The schedule script language according to the present embodiment is a marked descriptive language for description of a schedule script newly defined as a subset of an extensible markup language prescribed in the W3C (World Wide Web Consortium).

In a schedule script, a set of characters enclosed by '<' and '>' such as <inst id=inst-01>, <inst>, <title>, or </title> is referred to as a tag. The tags not starting with '</' are referred to as starting tags, and those starting with '</' are referred to as end tags. A starting tag and an end tag are used in combination such as <inst id=inst-01>, </inst> or <title>, </title>. The combination is referred to as a tag set. For example, 'id' in <inst id=inst-01> is an attribute of the tag, and 'inst-01' is a value of an attribute.

A schedule script is described by the hierarchical structure of tag sets which are the above mentioned combinations. When there is no tag set in the portion inside a tag set, the portion indicates the contents of the tag set. A schedule script is formed by a tag, an attribute, and the contents of a schedule script language. Assume that there is the following schedule script

---

<inst>
  <time> ○ </time>
  <schedule> Δ </schedule>
  <info> □ </info>
 </inst>

---

Between <inst> and <inst> in the schedule script, the portion (○) enclosed by <time> and </time>, the portion (Δ) enclosed by <schedule> and </schedule>, and the portion (□) enclosed by <info> and </info> indicate that 'there is a schedule Δ at the time ○ and the user is informed of the information described in □ at that time'. The 'inst' indicates an instruction.

---

<inst>
  <point> ○ </point>
  <schedule> Δ </schedule>
  <action> □ </action>
 </inst>

---

Between <inst> and </inst> in the schedule script above, the portion (○) enclosed by <point> and </point> between <inst> and </inst>, the portion (Δ) enclosed by <schedule> and </schedule>, and the portion (□) enclosed by <action> and </action> indicate that 'there is a schedule Δ at the place ○ and an action described in □ is taken at that place'. Thus, a schedule is described for a time condition, a place condition, or a combination of them. The schedule is described as to how the schedule is presented to the user, what action is suggested to the user, or what action is to be taken when the time condition and the place condition are satisfied.

Described below is a practical example of descriptions. First, relating to the time condition, absolute specification, relative specification, and range specification can be performed and described as follows.

<time>12:00</time>

This represents an absolute expression of 12:00.

<time>+5sec</time>

This represents a relative expression of 5 seconds after the previous instruction.

<time>−10min</time>

This represents a relative expression of 10 minutes before the subsequent instruction.

<time>11:00–13:00</time>

This represents the specification of a time in a range from 11:00 to 13:00.

As a condition with a range, a week or a day can be specified instead of a time. In addition, a periodical time condition such as 'every third day' can also be specified.

As for a place condition, absolute specification, relative specification, and range specification can be performed and described as follows.

<longitude>○○<longitude>
    <latitude>○○<latitude>

The description above indicates a direct and absolute place by the coordinates of a longitude and a latitude.

<name>○○</name>
    <address>○○</address>
    <phone>○○</phone>

The description above indicates an indirect and absolute place by the name, address, and phone number.

<location>+1.0 km </location>

The description above indicates a relative place as 1 km subsequent to the previous point.

<location>−1.0 km </location>

The description above indicates a relative place as 1 km preceding the next point.

<name>○○ national park</name>
    <address>○○ ku ○○ cho</address>
    <zip>123-4567</zip>

The description above indicates an indirect place range by the name, address, and post code. Normally, they are defined as child elements of <point>. It is also possible to define a range by an attribute such as <point area="1 km">.

<route>
    <name>National Route No. 1</name>
    </route>

The description above indicates the specification of a route by the name.

<route src="route-data.dat">
    </route>

The description above indicates the specification of route information by the data file.

<route func="route-function.fnc">
    </route>

The description above indicates the specification of route information by the function.

A schedule description describes a schedule performed when the condition is satisfied.

Personal Schedule
    <schedule>meeting</schedule>
    <schedule>meeting with ○○</schedule>
    <schedule>business trip</schedule>
    <schedule>conference</schedule>
    <schedule>party</schedule>
    <schedule>date</schedule>

Event Information
    <schedule>professional baseball game ○○ vs 1 </schedule>
    <schedule>□□ concert</schedule>

As for a method of presenting to a user, and a suggestion and performance of an action, the following data is input.

<info>
    <text>○○</text>
    <voice>○○</voice>
    <sound>○○</sound>
    <image>○○</image>
    <video>○○</video>
    <alarm/>
    </info>

As described above, specification can be made such that character data, speech data, music data, image data, and picture data can be output, or such that an alarm can be raised. <alarm/> is short for the tags of <alarm></alarm>. Such a short description is used when there are no contents between a start tag and an end tag. In addition, a practical action can be written using an <action> tag.

<action>
    automatic rerouting
    </action>
    <action>
    E-mail
    </action>

As described above, text information is input, and the determination can be left to the application.

```
<action>
    Add_point(point1);
</action>
<action>
    sendmail(A, "○○");
</action>
```

In addition, as described above, the description can be made using the API (application program interface) of an application.

For an <info> element and an <action> element, some attributes are specified, for example, as follows.

<info delay="−5min">

As described above, the starting time for outputting information is specified. In this example, the information is output 5 minutes before the schedule is performed.

<info duration="1 min">

As described above, the duration of outputting the information is specified. In this example, the information is presented for 1 minute.

<info times="5">

As described above, the times of outputting the information is specified. In this example, the information is presented 5 times.

[Example of Description of Schedule Script]

Described below is a practical example of the schedule script described in the schedule script language.

```
<<Example 1>>
<schedulescript version = "0.1">
    <inst>
        <time> 6/2 </time>
        <schedule>business trip (Nagoya) </schedule>
        <info delay = "-1 day">
            <alarm/>
            <text> Be ready for the business trip to Nagoya
            tomorrow. </text>
        </info>
        <action> obtain a set of tickets of Shinkansen </action>
    </inst>
    <inst>
        <point>
            <name> Shinjuku </name>
        </point>
        <schedule> buy a roll of film </schedule>
        <info>
            <alarm/>
            <text> buy a roll of film </text>
        </info>
    </inst>
    <inst>
        <time> 12:00–13:00 </time>
        <point>
            <name> Nagoya </name>
        </point>
        <schedule> Eat misokatu </schedule>
        <info>
            <text> Eat misokatu </text>
            <image src="misokatu-img.gif"/>
        </info>
    </inst>
    <inst>
        <time> 10:00–18:00 </time>
        <point>
            <name> Tokyo Station </name>
        </point>
        <schedule> Buy a book ΔΔ </schedule>
        <info>
            <text> Buy a book ΔΔ </text>
            <image src="nanaesubookcenter-map.gif"/>
        </info>
    </inst>
</schedulescript>
```

In this example, the following schedules are described.

Raising the alarm, displaying the schedule, and suggesting and performing an action of 'obtaining a set of tickets' one day before June 2;

Raising the alarm, and displaying the schedule of 'buying a roll of film' at Shinjuku.

Displaying the schedule of 'Eating misokatu', and presenting the picture of misokatu at 12:00 to 13:00 in Nagoya; and At Tokyo station at 10:00 to 18:00, displaying the schedule of 'buying the book ΔΔ', and presenting the picture of the map to the book store (nanaesu book center). When the time and position conditions are satisfied, the schedule is performed.

```
<<Example 2>>
<schedulescript version = "0.2">
    <head>
        <title> Healthy Day Plan </title>
        <author> Ministry of Welfare </author>
        <date> 2000/01/01 </date>
        <duration> 24 hour </duration>
    </head>
    <body>
        <inst ref = "inst-Getting up"> </inst>
        <inst ref = "inst-Radio Exercise"> </inst>
        <inst ref = "inst-Breakfast"> </inst>
        <inst ref = "inst-Toilet"> </inst>
        ...
        ...
        ...
    </body>
    <inst id = "inst-Getting up">
        <time> 6:00 </time>
        <schedule> Getting up </schedule>
        <info>
            <alarm/>
            <voice> Get up! </voice>
        </info>
    </inst>
    <inst id = "inst-Radio Exercise">
        <time> 6:30 </time>
        <schedule> Radio Exercise </schedule>
        <info>
            <sound src="radio-gim.au"/>
        </info>
    </inst>
    <inst id = "inst-Breakfast">
        <time> 7:00–7:30 </time>
        <schedule> Breakfast </schedule>
        <info>
            <url> http://www.mhw.go.jp/
            today-menu/ </url>
        </info>
    </inst>
    <inst id = "inst-Toilet">
        <point>
            <category> toilet </category>
        </point>
        <info>
            <voice> Let's wash hands
                with soap. </voice>
        </info>
    </inst>
    ...
    ...
    ...
</schedulescript>
```

In this example, a schedule for a healthy life is described. According to the model schedule, a user can live a healthy life. The outline of the entire schedule such as the title, the version, etc. of the schedule script is described by <head></head>. The instructions defined by the schedule script are specified by <body></body>. In this example, a reference is used as an instruction, and the descriptions of and subsequent to </body> specify the contents of each Instruction.

Otherwise, for example, when 'the ○X Exhibition is held in Ikebukuro until June, and there are free passes. However, since the user is not willing to visit there all the way with the fare be borne by the user, he or she will visit there if there arises something to be done in Ikebukuro,' the following instruction can be written by a schedule script.

```
<inst>
    <point>
        <name> Ikebukuro </name>
    </point>
    <time> June </time>
    <schedule> ○X Exhibition </schedule>
    <info>
        <text> ○X Exhibition
                at ΔΔ department store</text>
    </info>
    <schedule>
</inst>
```

When there is an event limited in period, and a user has something else to be done near the place where the exhibition is held, the description above can be effective. For example, there can be a schedule such as a bargain sale, a free market, a festival, an exhibition, going to a friend's to check how children are doing, saying hello to a customer to whom a salesman is grateful, etc.

Since a relative and periodical schedules can be described, a schedule of 'Let's go to the barber's.' can be suggested and described. Such a periodical schedule is generated by the function of automatically generating a schedule script, and can be automatically added to a script upon detection of the cycle of an action.

[Example of Converting a Schedule Script into Structured Data for Schedule Management]

The above mentioned schedule script can be once converted into a form easily processed by an available terminal by the schedule conversion unit 12. A converting method can be, for example, representing a tree structure as is as a structure. The portion of the title of the schedule script of the above mentioned <<Example 2>> can be represented as follows.

schedulescript.head.title=healthy day plan.

In addition, time-processed schedules and place-processed schedules can be separately managed, or a schedule management can be performed by converting a schedule into an easily processed form.

Described below is an example of a further practically converting process. Assume that there is the following schedule script.

```
<<Example 3>>
<schedulescript version = "0.1">
    <inst>
        <point>
            <name> Tokyo Station </name>
        </point>
        <schedule> Buying 'Ningyouyaki' which is an item specific to Tokyo </schedule>
        <info>
            <text> Buy 'Ningyouyaki' which is an item specific to Tokyo. </text>
            <image src="tokyo-station.gif"/>
        </info>
    </inst>
    <inst>
        <time val="once"> 10:00–18:00 </time>
        <point>
            <name> Tokyo Nanaesu Book Center </name>
        </point>
        <schedule> Buy a book ΔΔ </schedule>
        <info area="200 m">
            <text> Buy a book ΔΔ </text>
            <image src=nanaesubookcenter-map.gif/>
        </info>
    </inst>
    <inst>
        <time val="continue"> 11:00–12:00 </time>
        <schedule> Meeting at Company A (in Shinjuku) </schedule>
        <info delay="–30min">
            <alarm/>
            <text> There is a meeting at Company A in Shinjuku 30 minutes later.
        </text>
            <voice> There is a meeting at Company A in Shinjuku 30 minutes later.
        </voice>
            <image src="Map to Company A.gif"/>
        </info>
        <info delay="–5min">
            <text> There is a meeting at Company A in Shinjuku 5 minutes later. </text>
            <voice> There is a meeting at Company A in Shinjuku 5 minutes later.
        </voice>
            <image src="Building of Company A.gif"/>
        </info>
    </inst>
    <inst>
        <time val="continue"> 15:00–17:00 </time>
        <schedule> Conference (Office) </schedule>
        <info delay="–30min">
            <alarm/>
            <text> There is a conference in the office 30 minutes later. </text>
        </info>
        <info delay="–5min">
            <alarm/>
            <text> If you cannot be in time, make a call. </text>
        </info>
    </inst>
    <inst>
        <point>
            <name> Shinjuku </name>
        </point>
        <schedule> buy a roll of film </schedule>
        <info>
```

```
        <alarm/>
        <text> buy a roll of film </text>
      </info>
    </inst>
    <inst>
      <time val="continue"> 12:00–13:00 </time>
      <point>
        <name> Ginza </name>
      </point>
      <schedule> Go to the topical restaurant X. </schedule>
      <info>
        <alarm/>
        <text> Go to the topical restaurant X. </text>
      </info>
    </inst>
</schedulescript>
```

In a schedule script, there can be an action 'continue' to be continuously performed during a period and an action 'once' to be performed only once during the period even if a time condition is specified by <time>. In the above mentioned schedule script, these actions are distinguished from each other using the val=continue and val=once of <time>.

When a user specifies a period to display the schedule of the corresponding time condition, the schedule is displayed if the condition of either 'continue' or 'once' is contained in the period.

On the other hand, in the mode in which a schedule is presented and executed depending on the actual or virtual current time and current place, a schedule is presented and executed on the starting time of the time condition for 'continue'. For 'once', another schedule, etc. is considered under the time condition, and the priority of presenting and performing the schedule is lowered. As a result, for example, a schedule is displayed when the user is not busy during the period specified by the time condition.

FIG. 2 shows a table of structured data obtained by converting the schedule script. According to the schedule on the table shown in FIG. 2, the presented contents are displayed in the method of a specified form under the presentation condition when the time and the place satisfy the conditions. The data can be stored, for example, in the following form using a structure.

inst[1].time=NULL;
inst[1].point="Tokyo Station";
inst[1].schedule="Buying 'Ningyouyaki' which is an item specific to Tokyo";
inst[1].info[1].condition=NULL;
inst[1].info[1].text="Buy 'Ningyouyaki' which is an item specific to Tokyo.";
inst[1].info[1].image="tokyo-station.gif";
inst[2].time="10:00–18:00";
inst[2].time_var=once;
inst[2].point="Tokyo Nanaesu Book Center";
inst[2].schedule="Buy the book ΔΔ.";
inst[2].info[1].condition.area="200 m";
inst[2].info[1].text="Buy the book ΔΔ.";
inst[2].info[1].image="nanaesubookcenter-map.gif";
inst[3].time_var=continue;
inst[3].time="11:00–12:00";
inst[3].point=NULL;
inst[3].schedule="Meeting at Company A (Shinjuku)";
inst[3].info[1].condition.delay="–30 min";
inst[3].info[1].alarm=ON;
inst[3].info[1].text="There is a meeting at Company A in Shinjuku 30 minutes later.";
inst[3].info[1].voice="There is a meeting at Company A in Shinjuku 30 minutes later.";
inst[3].info[1].image="Map to Company A.gif";
inst[3].info[2].condition.delay="–5 min";
inst[3].info[2].text="There is a meeting at Company A in Shinjuku 5 minutes later.";
inst[3].info[2].voice="There is a meeting at Company A in Shinjuku 5 minutes later.";
inst[3].info[2].image="Building of Company A.gif";
inst[4].time_var=continue;
inst[4].time="15:00–17:00";
inst[4].point=NULL;
inst[4].schedule="Conference (Office)";
inst[4].info[1].condition.delay="–30 min";
inst[4].info[1].alarm=ON;
inst[4].info[1].text="There is a conference in the office 30 minutes later.";
inst[4].info[2].condition.delay="–5 min";
inst[4].info[2].alarm=ON;
inst[4].info[2].text="If you cannot be in time, make a call.";
inst[5].time=NULL;
inst[5].point="Shinjuku";
inst[5].schedule="Buy a roll of film.";
inst[5].info[1].condition=NULL;
inst[5].info[1].alarm=ON;
inst[5].info[1].text="Buy a roll of film.";
inst[6].time_var=once;
inst[6].time="12:00–13:00";
inst[6].point="Ginza";
inst[6].schedule="Go to the topical restaurant X.";
inst[6].info[1].condition=NULL;
inst[6].info[1].alarm=ON;
inst[6].info[1].text="Go to the topical restaurant X.";

Described below is the process of each unit in the configuration example of the present invention shown in FIG. 1.

(1) Process of Input Unit

The input unit 11 obtains the schedule script stored in the center 60 and the media 50. FIG. 3 shows the process flow of the input unit 11.

When a user is requested to input an operation, or an automatic input of a schedule is requested, the center 60 is accessed by the network access unit 18 through a network 40, or the media 50 storing a schedule script is accessed by the media access unit 19, and a user-desired schedule script is read (S11). The read schedule script is passed to the schedule conversion unit 12 (S12). At this time, the body of the schedule script is received from the media 50. However, in the script, the external image file specified using the URL (uniform resource locator) can be received from the network 40.

(2) Process of Schedule Conversion Unit

The schedule conversion unit 12 converts a schedule script described in a markup language into structured data for schedule management for easier process by a computer, and for easier schedule management. This process is performed to improve the process efficiency of a computer, and is not required when the instruction process unit 13 directly refers to a schedule script.

FIG. 4 shows the process flow of the schedule conversion unit 12. As shown in FIG. 4, the schedule conversion unit 12 receives a schedule script from the input unit 11 (S21), converts the schedule script into the structured data for the schedule management (S22), and passes the structured data for the schedule management to the instruction process unit 13 (S23).

The schedule conversion unit 12 converts a schedule into structured data referred to by the instruction process unit 13, and can have the function of converting it into various structured data for use in this system, other device, etc. Using the function, a script is converted into a form depending on the appliances, operating systems (OS), and applications. Thus, an entire schedule, or each instruction can be provided for each appliance, application, etc.

For example, if a schedule script is converted into procedure data, an action can be suggested and performed using the technology presented by the Japanese Patent Application No. 10-24113 (Action Suggestion and Performance Apparatus using Procedure Database with Function of Automatically Generating Procedure, and Procedure Database Storage Medium Therefor).

In this technology, a procedure database storing a procedure defined by a set of a condition about the environmental situation such as a time, a place, a situation, etc. and an action is prepared, the environmental situation is checked to detect the condition of retrieving a procedure database from the time, place, situation (including user-input information), etc., extract a corresponding procedure based on the condition, and pass the action of the procedure to an action suggestion and performing device. Thus, an action appropriate for the environmental situation can be automatically suggested or performed.

In addition, the schedule conversion units 12 exchange event schedules and personal schedules with other units (friends and groups belonging to a company), and adjust the obtained schedules and the user's schedule.

(3) Process of Instruction Process Unit

The instruction process unit 13 supplements the information about an unspecified portion, an obscure portion, etc. for the structured data for schedule management received from the schedule conversion unit 12, and executes an instruction described in the schedule based on the situation virtually set for the user's current situation or a simulation. The instruction process unit 13 performs the process shown in FIG. 5 as a preparatory process for the execution of an instruction, and performs the process as an executing process as shown in FIG. 6.

Figure 5:
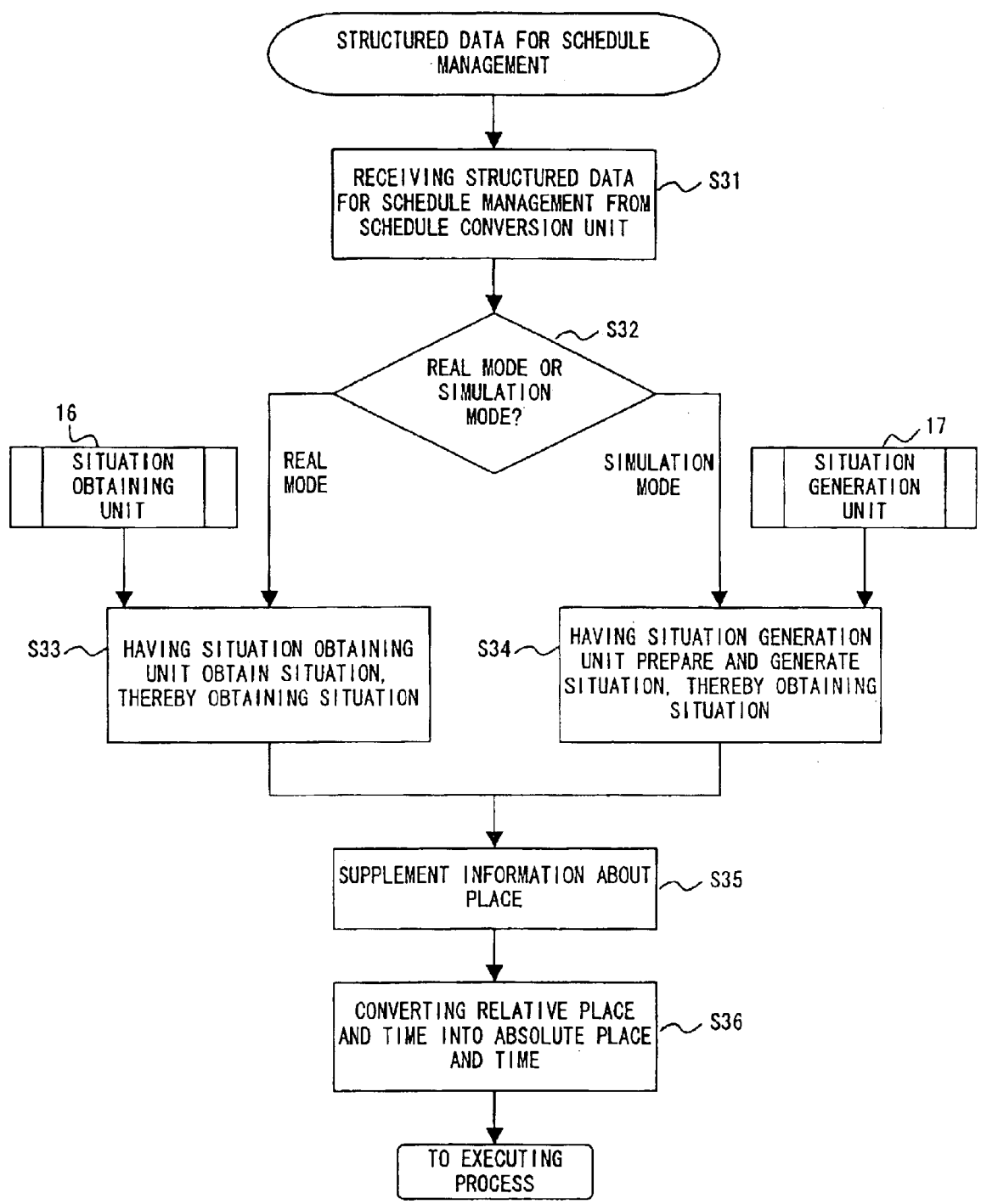
FIG. 5 shows a flow of the process of the preparing process of the instruction process unit.
Figure 6:
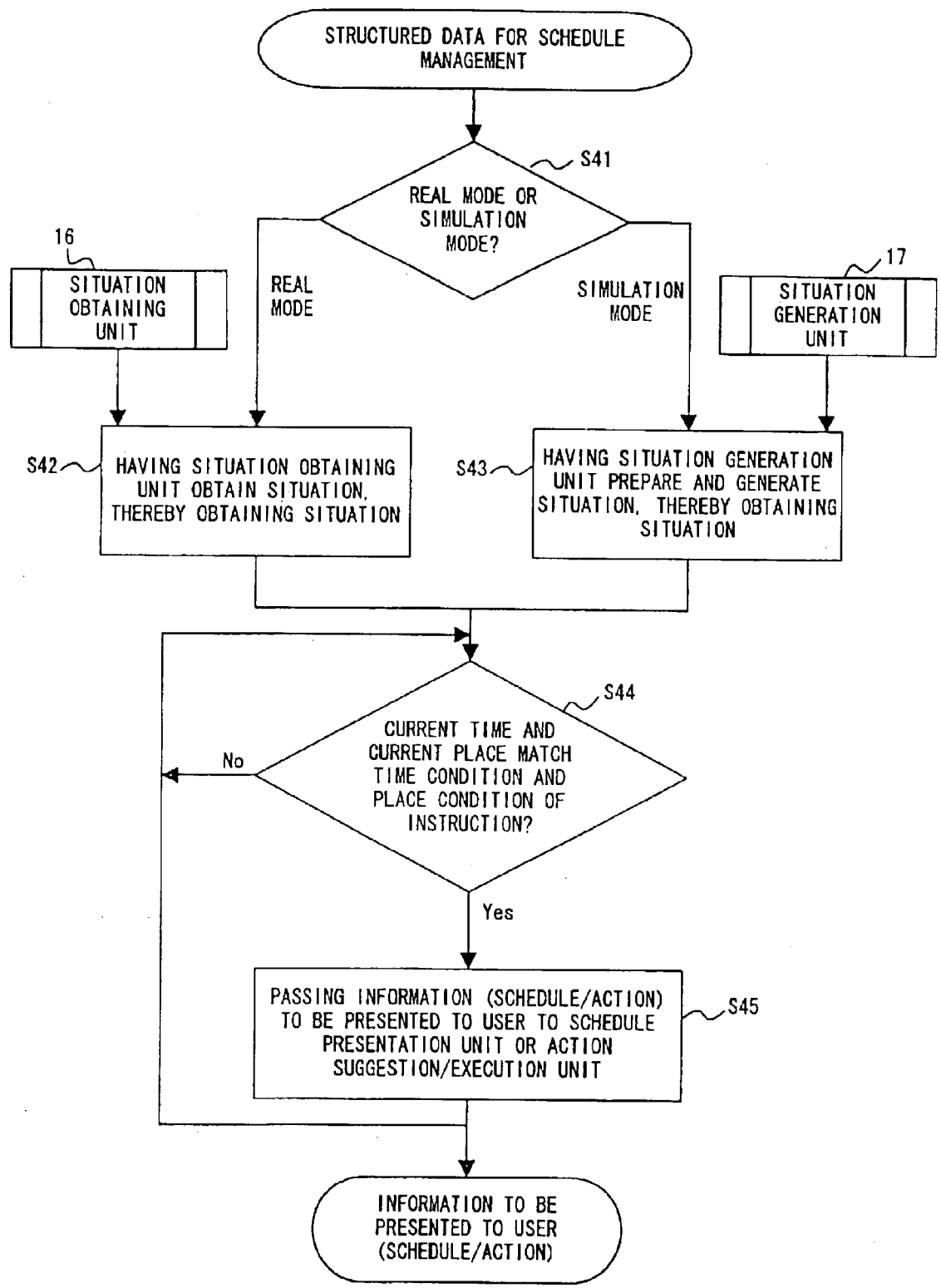
FIG. 6 shows a flow of the process of the executing process of the instruction process unit.

In the preparatory process for the instruction process unit 13, it is determined, upon receipt of the structured data for schedule management from the schedule conversion unit 12 (S31), whether the operation mode set by a user is a real mode or a simulation mode (S32) as shown in FIG. 5. When the operation mode is a real mode, the situation obtaining unit 16 obtains the situation (actual current time and current place) to obtain it for the system (S33). If the operation mode is a simulation mode, then a request to prepare for the situation is issued to the situation generation unit 17. When the preparation is completed, a request to generate the situation is issued to obtain the situation (virtual current time and current place) (S34).

Then, the information about the place in the structured data for schedule management is supplemented (S35). In the supplementing process in step S35, for example, in the various attributes relating to places such as a latitude, a longitude, an altitude, a name, an address, a phone number, a post code, etc., an attribute not described in the schedule script is retrieved from a database unit 30 using a described attribute as a key. If only an area is specified, the attribute of the typical place in the area is retrieved. For example, when only 'Shinjuku' or 'Mt. Fuji' is specified, the typical places such as 'Shinjuku Ward Hall', 'Shinjuku Station', . . . , or 'the top of Mt. Fuji', 'the climbing base of Mt. Fuji', . . . are respectively retrieved from the database unit 30. When there are a plurality of retrieval results, the user is requested to select one on the menu, or a retrieval result is selected using an appropriate evaluation index. Then, the retrieved and selected attribute is inserted into a corresponding position in the structured data for schedule management. This function largely depends on the method of managing a system and a schedule, and providing a schedule. There can be a number of methods. The supplementing process is performed when a user generates his or her own schedule. When a model schedule is downloaded from the center 60, since it is assumed that a schedule script which can be completely processed has already been described, it is omitted.

Then, all relative place and time specifications in the structured data for schedule management are replaced with absolute place and time specifications (S36), thereby terminating the preparatory process, and passing control to the executing process.

In the executing process of the instruction process unit 13, the instruction process unit 13 first determines whether the operation mode is a real mode or a simulation mode (S41) as shown in FIG. 6. When the operation mode is a real mode, the situation obtaining unit 16 is made to obtain the situation (actual current time and current place) to obtain it for the system (S42). If the operation mode is a simulation mode, a request to generate the situation (virtual current time and current place) is issued to the situation generation unit 17 to obtain it (S43).

When the actual current time and current place (in the real mode), or the virtual current time and current place (simulation mode) match the time condition and the place condition of an instruction (S44), the information (schedule/action) to be presented to a user is passed to the schedule presentation unit 14 or the action suggestion/execution unit 15 according to the instruction (S45). The operation is repeated until the termination event occurs.

When a condition is specified in range, a process continuing while the condition is satisfied, a process of indicating that the process is to be performed, a process of repeatedly presenting data at specified intervals, etc. can be realized. If conditions overlap, for example, presentation is performed based on the priority, menu form, etc.

Each instruction can be deleted if it is once presented, but the settings are normally performed according to the specifications of the duration, the times, etc. which are the attributes of the tags of <info> and <action>. When an instruction terminates after it is once presented, it can be removed after it is presented. However, an instruction is to be presented plural times, it is deleted after being presented the plural times. A normal time condition can be deleted after the specified time has passed because time never goes backwards, but a place condition remains unless the place disappears.

(4) Process of Situation Obtaining Unit

Figure 7:
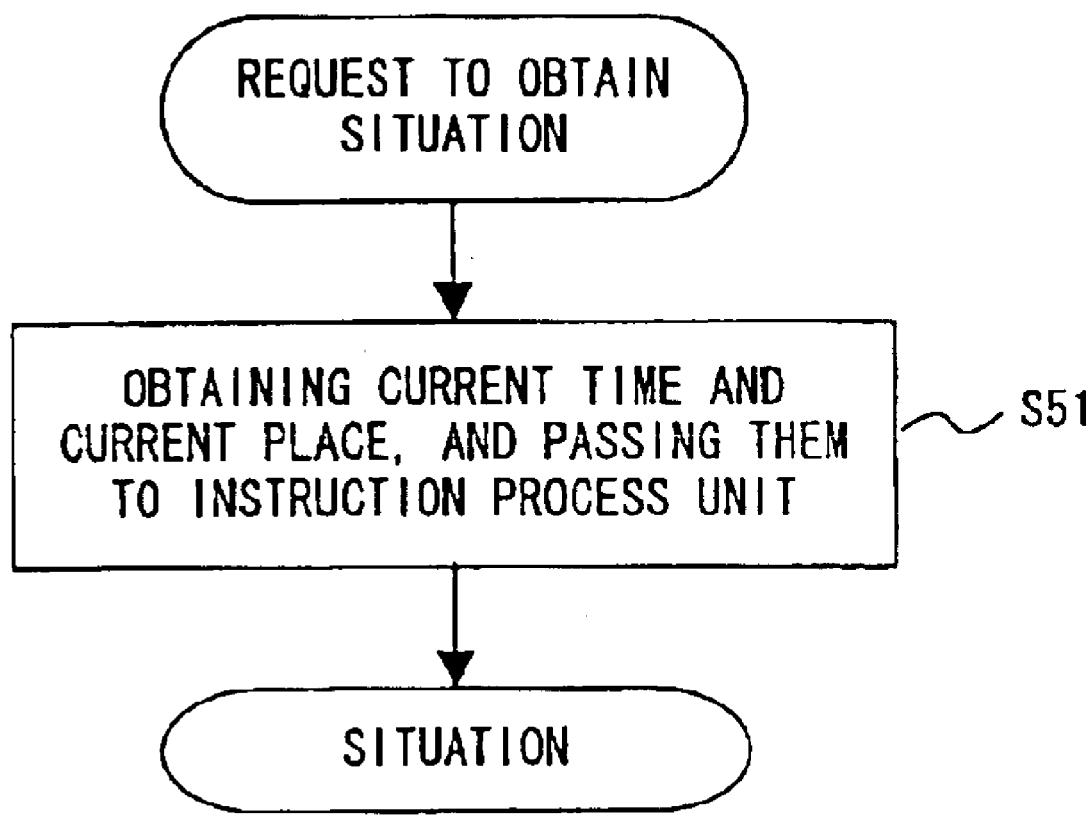
FIG. 7 shows a flow of the process of the situation obtaining unit.

The situation obtaining unit 16 obtains the situation such as the user's current time, current place, etc. FIG. 7 shows the process flow of the situation obtaining unit 16. As shown in FIG. 7, upon receipt of a request to obtain the situation from the instruction process unit 13, the situation obtaining unit 16 obtains the actual current time and current place from the GPS (global positioning system), etc., and passes them to the instruction process unit 13 (S51).

(5) Process of Situation Generation Unit

Figure 8:
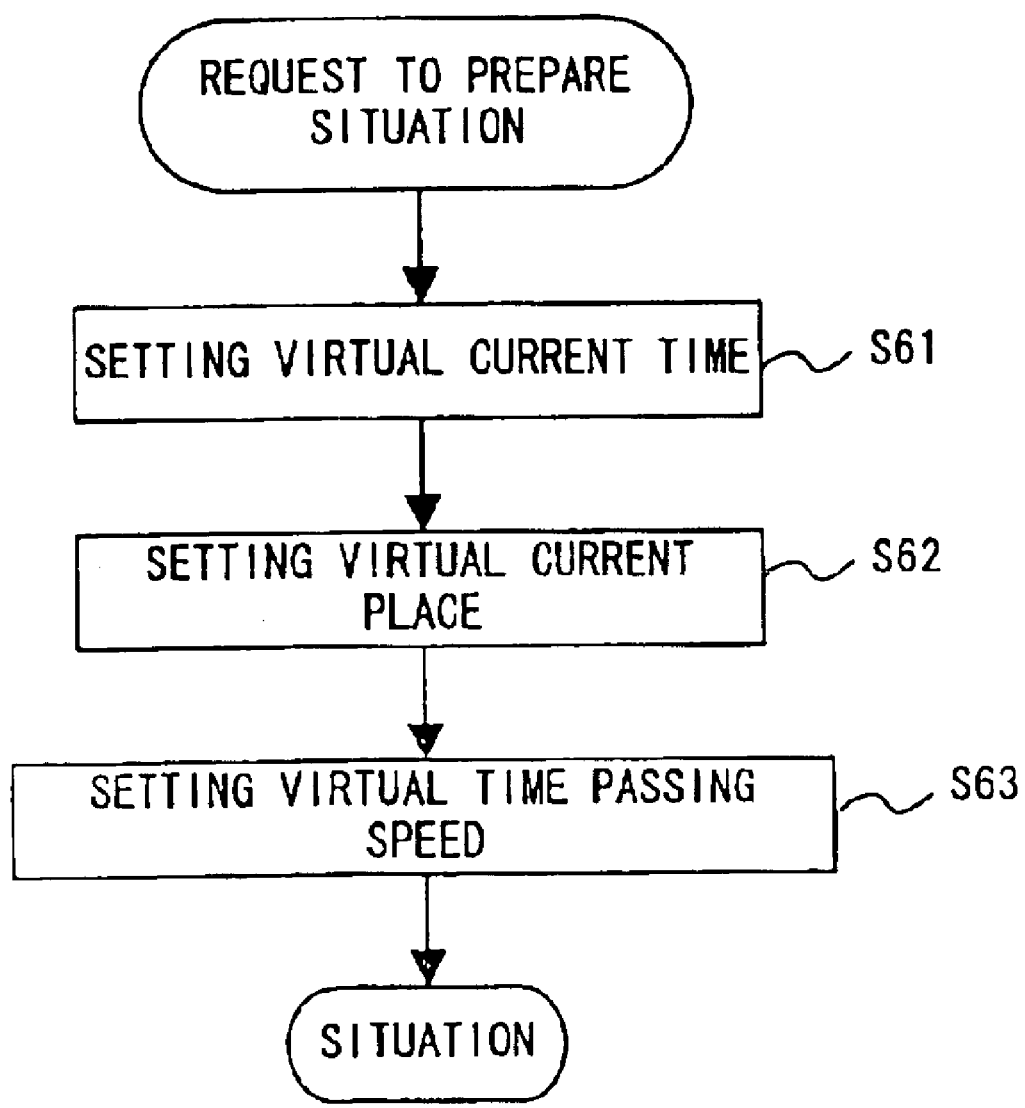
FIG. 8 shows a flow of the situation preparing process of the situation generation unit.

The situation generation unit 17 prepares and generates necessary values in a simulation mode such as a virtual current time, a virtual current place, etc. FIG. 8 shows the process flow of the situation preparing process of the situation generation unit 17. FIG. 9 shows the process flow of the situation generating process of the situation generation unit 17.

In the situation preparing process, upon receipt of a request to prepare for the situation from the instruction process unit 13 as shown in FIG. 8, the situation generation unit 17 sets the virtual current time to the time selected by the user or the system from among the actual current time and the time separately set by the user (S61). Then, the virtual current place is set to the point selected by the user or the system from among the actual current place, a user-separately-set position (for example, home, office, etc.), and the point appearing in the structure data of the schedule (S62). Then, the virtual time passing speed is set to the virtual time passing speed selected by the user or the system from among the system-set default virtual time passing speed and the user-separately-set virtual time passing speed (S63). In this case, time can go not only forwards but also backwards.

In the situation generating process, upon receipt of a request to generate the situation from the instruction process unit 13 as shown in FIG. 9, the situation generation unit 17 passes the virtual current time and the virtual current place to the instruction process unit 13 (S64), and updates the time according to the virtual current time and the virtual time passing speed (S65). The movement from a place to another is performed by updating the virtual current place (S66). For example, the user can use a mouse, etc. to intentionally move a position, specify random walking, or specify an appropriate supplement to movement between schedules, etc.

(6) Process of Schedule Presenting Unit

Figure 10:
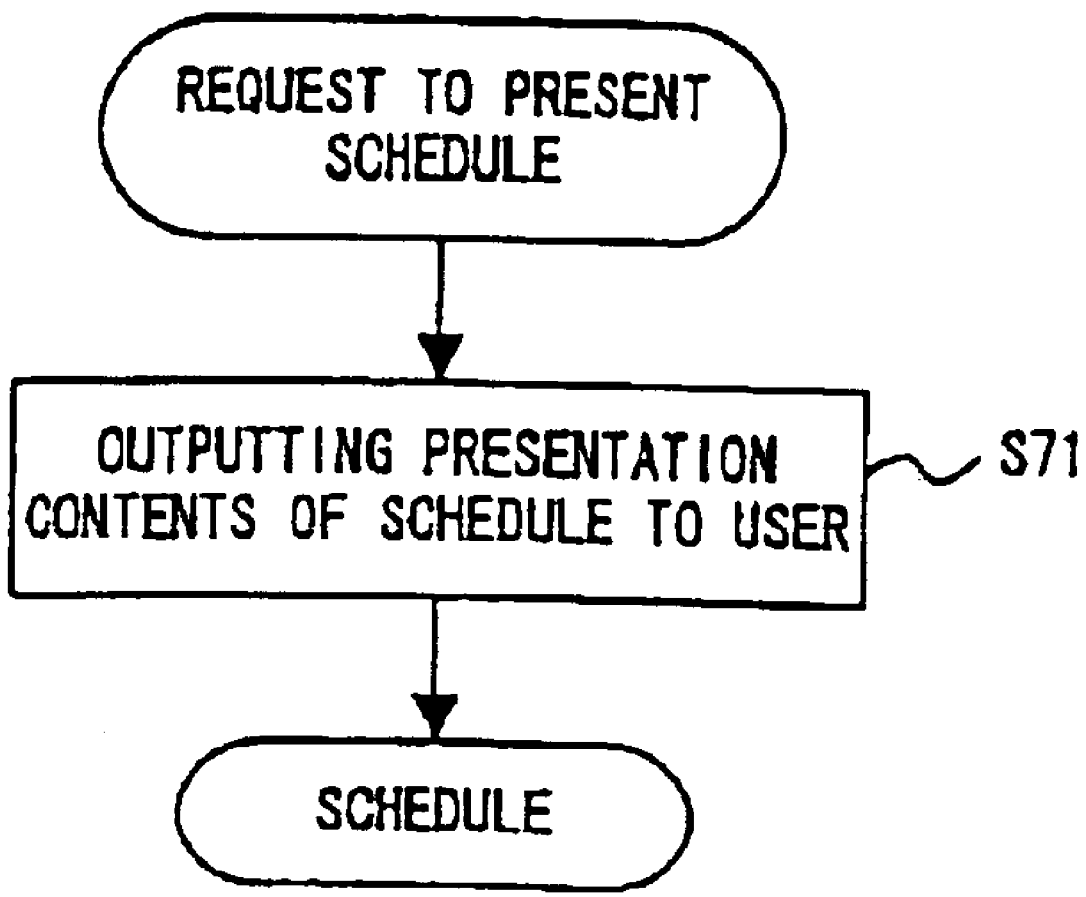
FIG. 10 shows a flow of the process of the schedule presentation unit.

The schedule presentation unit 14 presents the user with a schedule based on a schedule script FIG. 10 shows the process flow of the schedule presentation unit 14. Upon receipt of a request to present a schedule from the instruction process unit 13, the schedule presentation unit 14 outputs the information presented by the schedule to the user (S71). The presented information are text data, image data, speech data, etc.

(7) Process of Action Suggestion/Execution Unit

Figure 11:
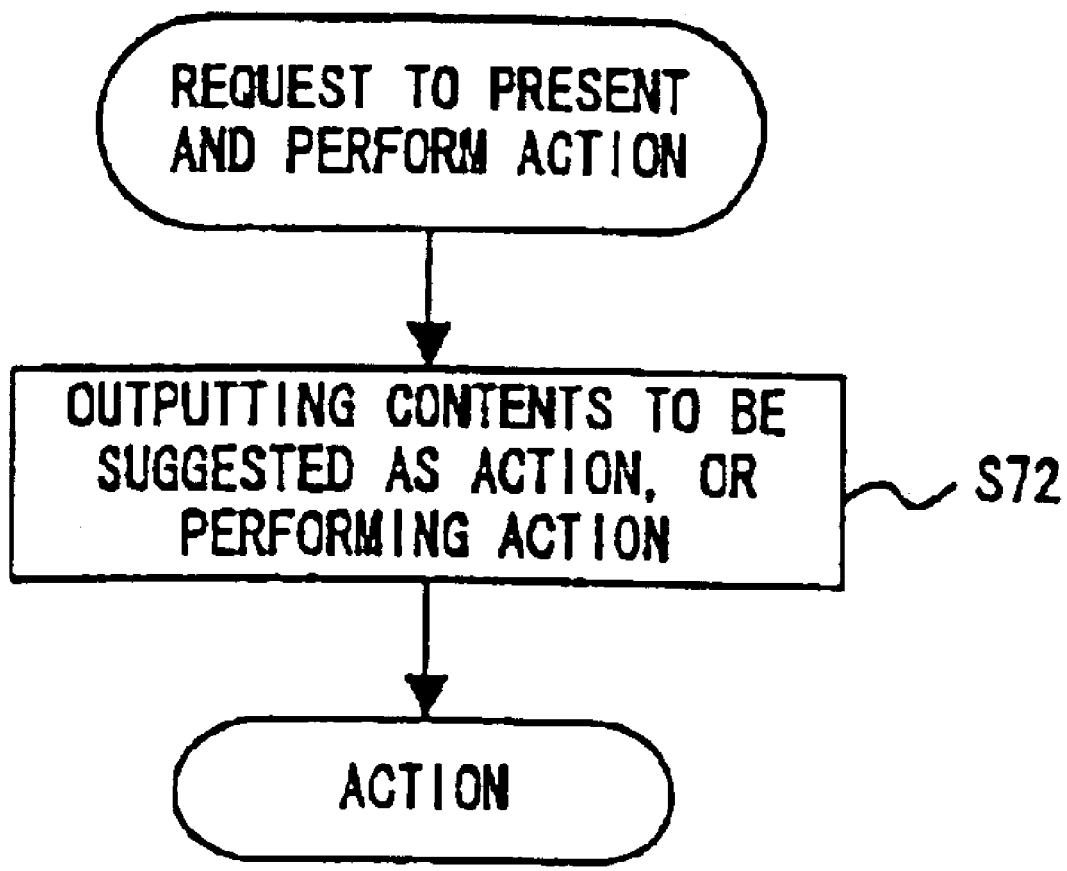
FIG. 11 shows a flow of the process of the action suggestion and execution unit.

The action suggestion/execution unit 15 suggests and performs an action for a user. FIG. 11 shows the process flow of the action suggestion/execution unit 15. Upon receipt of a request to suggest or perform an action from the instruction process unit 13, the action suggestion/execution unit 15 performs an action suggesting/performing process (S72).

The suggestion and performance of an action refers not only to present the information about a schedule, but also to have the function of performing a process to a certain extent. For example, if there is a schedule of 'asking the proceeding of the current project of Mr. A at 15:00', then not only the user is presented with the schedule, but also the system can automatically transmit to Mr. A the mail in formatted text asking the proceeding of the project at 15:00.

In addition, when the schedule script is executed in a car navigation system mounted in a car, and when there is a schedule of 'visiting company B at 10:00', the system can be designed such that not only the user is suggested to visit Company B, but also the route set in the car navigation system can be automatically edited into the route to approach Company B.

Thus, as the method of determining how an action is automatically processed, the technology disclosed by the Japanese Patent Application No. 10-345511 'Automation Level Adjustment Apparatus, Automation Level Adjusting Method, and Automation Level Adjustment Program Storage Medium' can be used. This technology is to select interactively with a user or automatically an automation level for performing an action based on the record of history information, etc. about a situation, user actions, etc. from among a plurality of selectable automation levels, and perform the action based on the selected automation level.

Otherwise, depending on whether or not a user can be in time for a schedule, advice such as 'Hurry up!', 'Slow down', etc. can be given, or a branch of a schedule can be specified depending on the situation, thereby suggesting and performing an action.

(8) Process of Center

The center 60 provides management and distribution services of schedule scripts. Upon receipt from a user, the center 60 distributes a corresponding schedule script The center 60 comprises a schedule edition unit 61 for editing a schedule script, and comprises a maintaining function and a retrieving function to manage a large volume of scripts. For example, the maintenance efficiency and the retrieval efficiency can be improved by storing schedule scripts with a unique number or name assigned for identification to a part or all of each schedule script, classifying and storing schedule scripts with specific items in the scripts, and storing only one body of a schedule script and the link to the body for each class. Furthermore, the retrieving method can be a method of not limiting targets, specifying the position to be searched using a tag, considering the structure, specifying the range of time and place, retrieving a script containing a plurality of specific schedule instructions, retrieving vague targets in association with a category, etc.

[Automatic Generation of Schedule]

By providing an automatic schedule generation unit 20 in the user terminal 1, the function of automatically generating a schedule script based on the actual action in addition to a normal text editor and an editor using a GUI. FIG. 12 shows an example of the configuration of the automatic schedule generation unit. FIG. 13 shows the process flow of the automatic schedule generation unit.

When the automatic schedule generation unit 20 receives a sign of starting a process from a user or a system, and the user starts his or her action (S81), a environmental situation detection unit 21 obtains the environmental situation associated with the user's action (S82). For example, time and place information is obtained from the GPS, and a time measurement unit 211, a place estimation unit 212, and a situation estimation unit 213 estimate the passage of time, the place of the user, and the situation.

An action estimation unit 23 estimates the action of the user at the time (S83), and an action determination unit 24 determines an action to be performed at the time (necessary action to present a schedule and make the user follow the schedule) (S84). Then, an instruction generation unit 25 assigns a corresponding tag to a set of an environmental situation and an action, and generates an instruction (S85). The process is repeated and terminated when there is a termination sign from a user or a system, and a schedule script generation unit 26 groups instructions, and enters them as a schedule script (S86).

An instruction can be generated: at a predetermined sampling time, when a corresponding action is detected in the action list stored in the action estimation unit 23, and when it is determined that a characteristic action has been detected based on any evaluation standard. Furthermore, a periodic action can be detected for a script. For example, if a user watches a drama during the same period of the week, it can be set as an instruction, and the TV is automatically turned on for the period and the channel. Furthermore, the process can be semiautomatically performed, and an instruction can be generated based on a set of the situation at a user-specified time and an action. Thus, a person not familiar with the markup language, etc. can easily generate a schedule script.

[Integration with Event Schedule]

According to the present invention, a plurality of schedule scripts can be easily integrated into one schedule script.

A personal schedule script described as a personal schedule is integrated with an event schedule script described as a schedule of an event (a sports match, a TV program, a concert, an event, etc.) published by a schedule server, etc. into one schedule script, and is presented with a user schedule as a schedule relating to an event. Thus, an associated action can be suggested and performed.

An example of the process is described by referring to FIG. 1. First, the user stores a personal schedule in the media 50. Upon receipt of a request to read a schedule script, the personal schedule script is read from the media 50 to the schedule conversion unit 12 through the media access unit 19, and simultaneously an event schedule is read from the center 60 storing event schedules to the schedule conversion unit 12 through the network 40 and the network access unit 18.

The schedule conversion unit 12 selects an instruction from the two read schedule scripts, and the selected instruction is integrated into the schedule script of the user. Since schedule scripts are simple text data, they can be easily selected and integrated by arranging them for each instruction. When a plurality of schedules are integrated, there can be schedules overlapping each other. In this case, one of the overlapping schedules is selected, or the user is asked to select one according to the personal schedule priority rule, etc. set by the user or the system.

Since there are innumerable event schedules, they can be filtered by the center 60 or the user terminal 1 on the client side according to the taste of the user. For example, if the user likes sports, but does not like music as the taste of the user, only the schedule script relating to sports event information is read, and the schedule script relating to music is omitted. Based on the integrated schedule script, and according to the information obtained by the instruction process unit 13 from the situation obtaining unit 16, the schedule presentation unit 14 presents a schedule to a user, or the action suggestion/execution unit 15 suggests and performs an action corresponding to a schedule with the time and place taken into account.

As described above, various processes can be performed by appropriately arranging schedule scripts, and a provider of event information can use the information as an advertisement. In addition, a schedule for each instruction can be transmitted to a target user. In a similar integrating method, schedules of colleagues and friends can be adjusted.

Described below is an example of a practical application of the present invention to various appliances.

[Example of Application of the Present Invention to PDA]

Described below is an example of a case in which the present invention is applied to a PDA (personal digital (data) assistant). The PDA is a small information terminal capable of efficiently managing personal information, such as a schedule notebook, an address notebook, a ToDo list, etc., which has been conventionally managed on a personal notebook, and is a convenient and portable terminal for a user.

Figure 14:
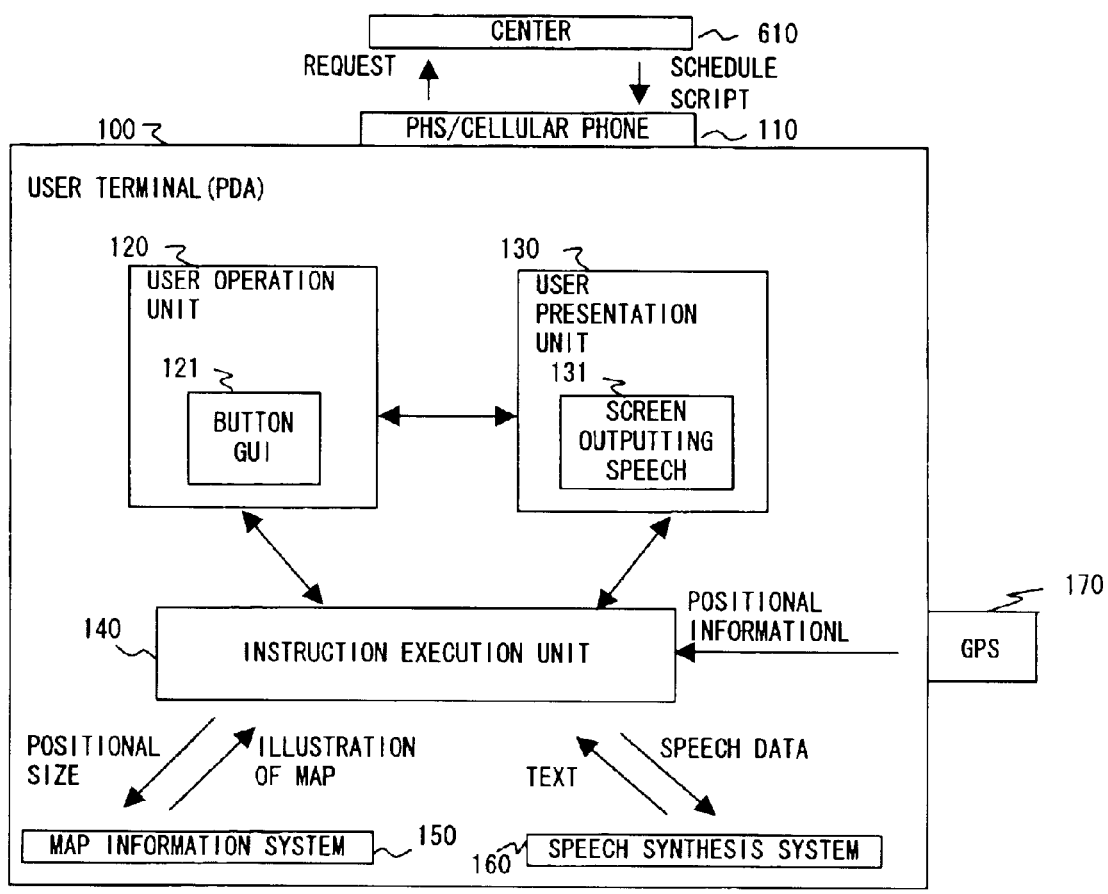
FIG. 14 shows an example of the configuration of the system when the present invention is applied to a PDA.

FIG. 14 shows an example of the system configuration in which the present invention is applied to the PDA. In FIG. 14, a center 610 corresponds to the center 60 shown in FIG. 1, a user terminal 100 corresponds to the user terminal 1 shown in FIG. 1, a PHS/cellular phone 110 corresponds to the network access unit 18 shown in FIG. 1, a user operation unit 120 corresponds to the input unit 11 shown in FIG. 1, a user presentation unit 130 corresponds to the schedule presentation unit 14 or the action suggestion/execution unit 15 shown in FIG. 1, an instruction execution unit 140 corresponds to the instruction process unit 13 shown in FIG. 1, a GPS 170 corresponds to the situation obtaining unit 16 shown in FIG. 1. A map information system 150 and a speech synthesis system 160 are not always required in the present invention, but are provided as effective and convenient units for use in presenting a schedule to a user.

Assume that there is a schedule script. It can be entered in the user 100 in advance, and can be obtained from the network when a communications device such as the PHS/cellular phone 110 shown in FIG. 14 is mounted.

The instruction execution unit 140 analyzes and executes the schedule script, and outputs a schedule as necessary based on the positional information from the GPS 170, the current time, etc. To clearly indicate the current position, the position and the scale are transmitted to the map information system 150 to obtain a corresponding map and display the position on the map, or the speech reading text in the schedule script can be passed to the speech synthesis system 160 to obtain speech data, thereby presenting a schedule in voice to the user.

Figure 15:
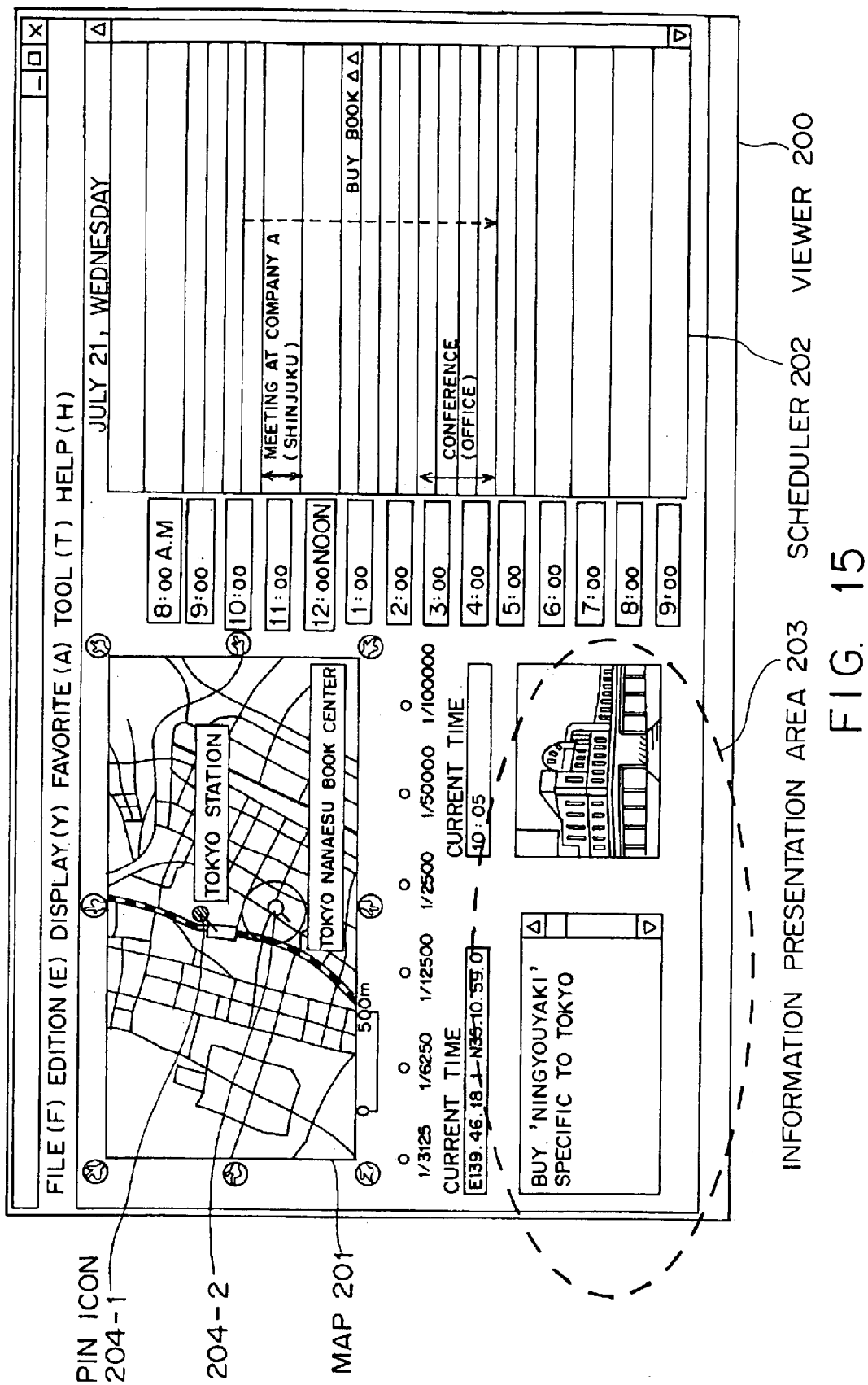
FIG. 15 shows an example of displaying a viewer.

FIG. 15 shows an example of a display screen of a viewer for a PC and PDA which displays the above mentioned schedule. A viewer 200 has a map 201 indicating a place, and a scheduler 202 indicating a time, and displays only the schedule corresponding to the displayed range.

As for a place, the 1/12500-scale map around Tokyo Station is displayed on the map 201 at the upper left of the viewer 200. For the schedule in the range, a pin-shaped icon indicates that there is a schedule.

In the schedule script as shown in the <<Example 3>> described above, the place conditions of the schedule of 'buying 'ningyouyaki' which is an item specific to Tokyo' according to the first instruction, and the schedule of 'buying the book ΔΔ' according to the second instruction are contained in the map range. Therefore, two pin icons 204-1 and 204-2 are displayed on the map 201. Since the second instruction specifies that 'area=200 m' as an information presentation condition, a circle having a 200 m radius is displayed, and the schedule information (second instruction) is presented when the user enters the range. On the other hand, 'buy a roll of film' according to the fifth instruction and 'go to the topical restaurant X' according to the sixth instruction are out of the range of the displayed map 201. Therefore, they are not displayed.

The display range of the map 201 is specified such that the user position can be displayed in the center when the user is moving. The display scale of the map 201 can be automatically varied by a user's moving speed. For example, when the user is moving in a moving method such as a car at a high speed, the display range can be enlarged. When the user is moving in a moving method such as feet at a low speed, the display range can be reduced. Furthermore, the displayed place and scale can be manually changed by the user. In this case, a display range change icon, a radio button, etc. are arranged around the map 201 for selection.

When the user arrives at a position satisfying the place condition, the information about a corresponding schedule is displayed in an information presentation area 203 as text and an image. Speech data can be presented in voice.

Even if the user does not actually visit the place, the information about a schedule corresponding to the place can be displayed in text and image on the information presentation area 203, and speech data can be read in voice so that the schedule can be confirmed by clicking a mouse on a pin icon 204 on the map when the display range is to be changed, or when the schedule for the place is confirmed.

As for a time, as displayed by the scheduler 202 on the right of the display screen of the viewer 200, There is a schedule table along a time axis, and a schedule in the range is displayed. In this example, since there is a schedule table from 8:00 in the morning on July 21 to 10:00 in the evening on the same day, the information in the time range is displayed. In the schedule script shown in the above mentioned <<Example 3>>, 'meeting at Company A (in Shinjuku)' according to the third instruction and 'Conference (office)' according to the fourth instruction are displayed. Even if there are schedules for the day other than July 21, they are not displayed then.

The time axis schedule table can be replaced with the schedule of the day or the schedule of the month. For example, if the calendar of July is put in the viewer 200 at the instruction of the user, all schedules in July are assigned. The ranges of the schedules continuing during the period are indicated by solid lines, and the ranges of the schedules to be performed only once are indicated by dotted lines.

If the time condition of a schedule is satisfied, the information about a schedule is displayed in the information presentation area 203 in text and image according to the presentation condition. Speech data of a schedule can be read in voice.

Even if the time is not actually reached, the information about a schedule can be displayed on the information presentation area 203 in text and image, and speech data can be read in voice so that the contents of the presented schedule can be confirmed at any time by clicking a mouse on a corresponding portion when it is checked what schedule guidance has been assigned to the schedule at the corresponding time.

Furthermore, as the second instruction and the sixth instruction in the schedule script described in the above mentioned <<Example 3>>, when there are a time condition and a place condition, no information is displayed on a map screen and a schedule table of a time axis unless any of the time and the place is in the range.

In the viewer 200 shown in FIG. 15, in the case of the second instruction, the time and the place are in the ranges of the map 201 and the time axis of the scheduler 202. Therefore, the information is displayed. If, for example, the place is specified by a date, and the date does not match the date on the time axis schedule table, the information is not displayed. Similarly, if the display range on the map 201 becomes not to contain the place condition, then the schedule disappears from the scheduler 202. In the case of the sixth instruction, the time is contained in the time axis schedule table of the scheduler 202. However, since the place in the place condition is not in the display range on the map 201, the schedule is not displayed on the map 201 or the scheduler 202.

About the method of displaying a schedule on the map, the system according to the present invention has the following characteristics.

(1) A place conditional schedule is displayed on a map.

(2) A place conditional schedule is managed on a map.

(3) A place conditional schedule is displayed as overlapping a corresponding place on a map. Otherwise, relating to the portion corresponding to map information, the information about a schedule is presented or executed by performing any operation on the portion (clicking, etc.).

(4) When a place conditional schedule is displayed, only a schedule within a display range on the displayed map is displayed. For example, when the scale or the size of a map is changed, the schedule in the range on the changed map is displayed.

(5) A schedule is displayed as overlapping the corresponding place on the map. Otherwise, relating to the portion corresponding to the map information, the information relating to the schedule is presented or executed by performing any operation on the portion.

(6) When a series of place and time conditional schedule is displayed on a map, the order in which a plurality of schedules are performed can be represented by sequentially linking them through lines.

(7) The range of the place condition of a place conditional schedule is displayed by drawing a figure on a map. For example, when there is a schedule of performing ○○ if a user enters a range of a radius of 100 m from a specified place, a circle having a radius of 100 m and the place in the center is displayed on the map.

(8) When a place and time conditional schedule is displayed using both a time axis schedule table and a map, only a schedule whose place and time conditions are contained in the display ranges of the time axis schedule table and the map, respectively, is displayed on both the time axis schedule table and the map. If one of the place condition and the time condition is not contained in the display range, the schedule cannot be displayed.

For example, assume that there is a schedule of viewing cherry blossoms on condition that the place condition is 200 m around Chidorigafuchi, and the time condition is April 1 through 10. Only when the display range of a map contains 200 m around Chidorigafuchi, and the time axis schedule table displays the period containing April 1 through 10, the schedule is displayed on the table and map. When one of the conditions is not satisfied, the schedule is not displayed. For example, when the time axis schedule table displays only April 1, that is, only one day, the schedule is not displayed. However, the entire month of April is displayed, the schedule is displayed.

(9) Only when the actual or virtual current time and current place meet the time condition and the place condition of a schedule, the schedule is displayed on the map and the time axis schedule table.

(10) As a user moves, the display range on the map is changed correspondingly, and a schedule in the moved-to range is displayed.

[Example of Application of the Present Invention to Cellular Phone/PHS]

Described below is an example in which the present invention is applied to a cellular phone and a PHS (personal handyphone system). In the cellular phone and the PHS, since it is difficult to perform a process having various functions because of their size and performance, most processes are performed in the center, and only displayed text data and speech data are transmitted to the cellular phone/PHS.

FIG. 16 shows an example of the system configuration in which the present invention is applied to the cellular phone/PHS. In this example, a center 620 corresponds to the center 60 shown in FIG. 1, the user terminal (cellular phone/PHS) 300 corresponds to the network access unit 18 shown in FIG. 1, a user operation unit 310 corresponds to the input unit 11 shown in FIG. 1, a user presentation unit 320 corresponds to the schedule presentation unit 14 and the action suggestion/execution unit 15 shown in FIG. 1, an instruction execution unit 621 corresponds to the instruction process unit 13 shown in FIG. 1, and the GPS 330 corresponds to the situation obtaining unit 16 shown in FIG. 1.

In this example, a schedule script is stored in the center 620. The center 620 can be informed of the position of a user terminal 300 from the base station for receiving an electric wave output by the user terminal 300. Otherwise, when the user terminal 300 is provided with a device such as a GPS 330, the current position of the user terminal 300 is obtained by transmitting the positional information from the user terminal 300.

In the center 620, when the instruction execution unit 621 analyzes and executes the schedule script for the user terminal (cellular phone/PHS) 300, and when the positional condition and time condition match the received positional information and the time information, the text, image, and speech information for presentation of a schedule are transmitted to the user terminal 300. Thus, the user terminal 300 receives schedule information, and text/image/speech information can be presented by the user presentation unit 320.

Figure 17:
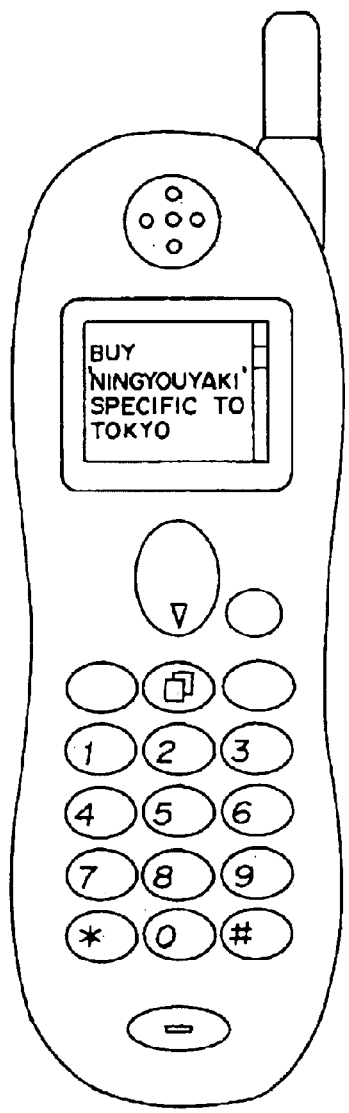
FIG. 17 shows an example of the appearance of a user terminal (cellular phone/PHS), and an example of displaying text information about a schedule.
Figure 18:
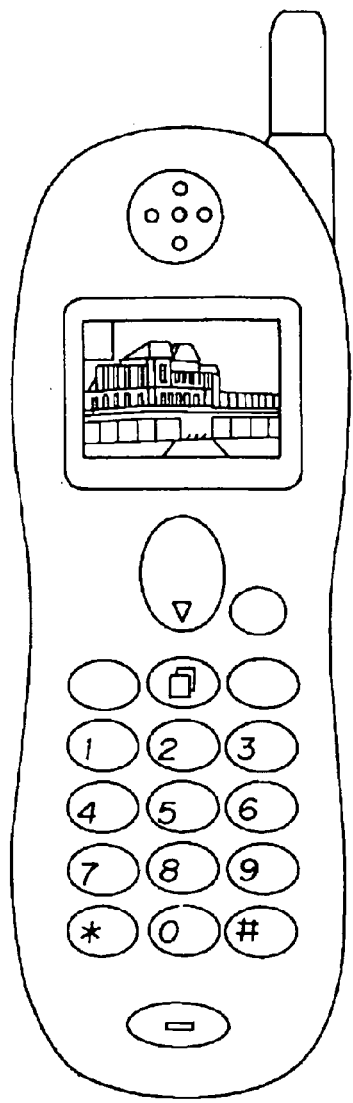
FIG. 18 shows an example of the appearance of a user terminal (cellular phone/PHS), and an example of displaying image information about a schedule.

FIGS. 17 and 18 show an example of the appearance of the user terminal 300. FIG. 17 shows an example of a display when the information presented by a schedule of the user presentation unit 320 is text information. FIG. 18 shows an example of a display when it is image information. These displays can be switched by a switch button provided as, for example, the user operation unit 310.

In the above mentioned embodiments, the system of displaying a schedule depending on the current time and place is described, but there can be a system of displaying a schedule depending on the range of a user-specified time and place information. The range of time information refers to the display range of a time axis displayed when a user checks a schedule note by specifying the period of one month, one week, one day, etc. The range of place information normally refers to the display range of a map displayed to a user.

Figure 19:
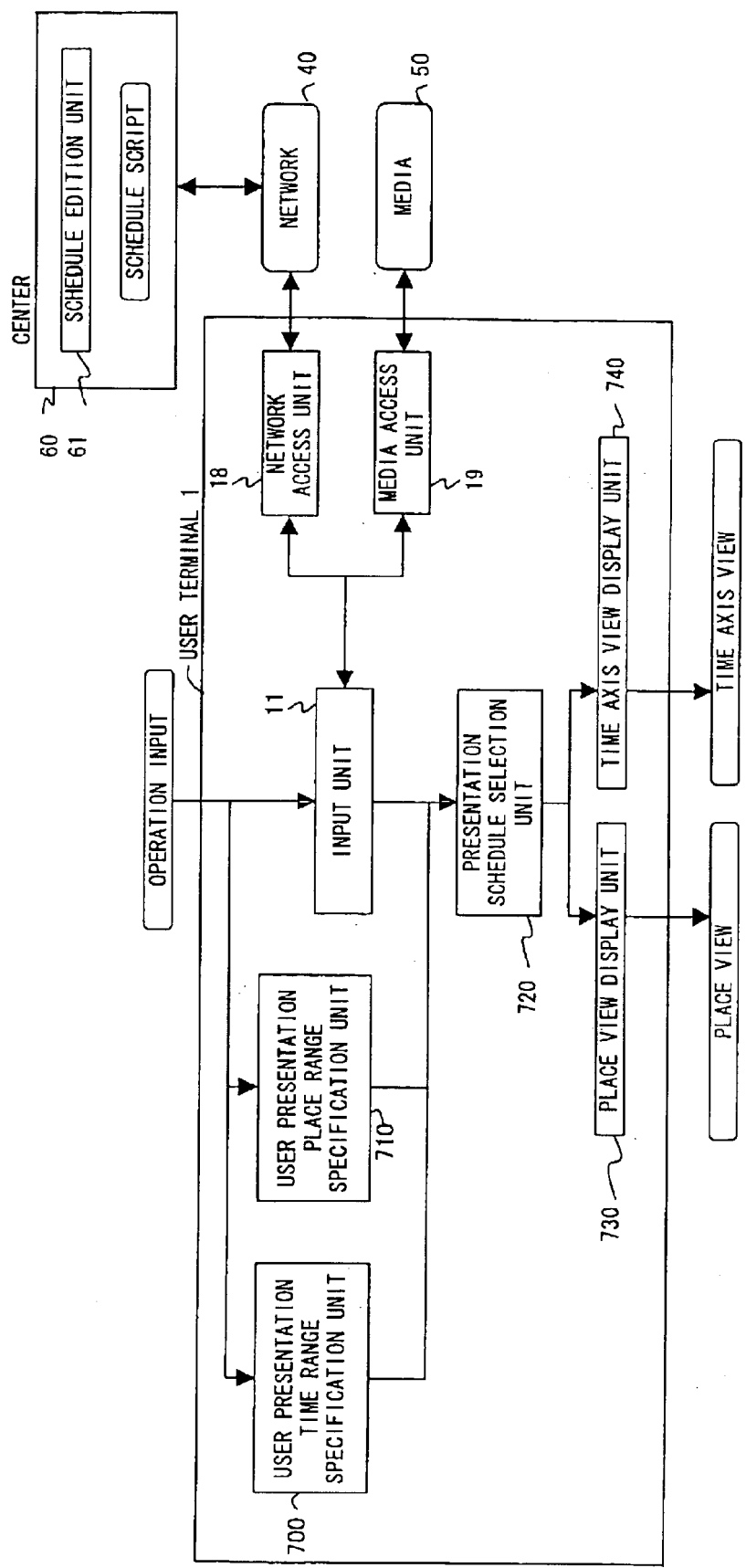
FIG. 19 shows another example of the configuration of the present invention.

FIG. 19 shows an example of the configuration of the system. In FIG. 19, the component also shown in FIG. 1 is assigned a common reference numeral. A user presentation time range specification unit 700 specifies the range (one hour, one day, one week, one month, etc.) of time information for display of a schedule based on the user operation input. Depending on the case, the range is automatically adjusted by the system.

In addition, a user presentation place range specification unit 710 specifies the range of place information for display of a schedule based on the operation input of the user. In a normal operation, the scale of a map, the display size, place, etc. are changed. In the case of that a user is moving, etc., the range can be automatically adjusted by the system.

A presentation schedule selection unit 720 selects only schedules contained in the range specified by the user presentation time range specification unit 700 and the user presentation place range specification unit 710 from among the schedules input by the input unit 11, and passes the schedules to a place view display unit 730 and a time axis view display unit 740. As shown in FIG. 15, the place view display unit 730 and the time axis view display unit 740 display the received schedules on the map and the time axis schedule table, respectively.

[Other Effective Embodiments]

(1) Various schedule scripts such as a life of a lord in Edo Period in Japan, a schedule of an idol, a scene of a film, a practice schedule of a professional baseball player, a day of a president, a line of a main character in a role playing game, etc. can be sold through Internet, a prepaid card, an appendix to a magazine, a terminal provided on a street, etc. An advertisement of a shop, and a guide to movies can also be included.

(2) In addition, the function of automatically generating a schedule enables a travel record to be automatically generated. A user can enjoy the experience of the travel by reproducing it in a simulation mode.

(3) A schedule script is described for an object other than a human being, and an interaction between objects is processed. As a result, an action and a process of an animal, an article, a substance, and information can be visually checked. For example, the life of a traveling bird, a day of a letter, a process of electronic mail, etc. can be explained, and can be used for education.

(4) Since an action plan can be described in a schedule script, a reservation can be made for a hotel, a restaurant, etc., and a transportation or concert ticket can be obtained according to the action plan. This can be realized by describing instructions for the transportation means on a moving route and places to be visited (contact information and reservation information) onto the schedule script, and by performing an action of notifying the transportation means and the places to be visited described on the schedule script of the contact information and reservation information before moving according to the schedule script.

As described above, according to the present invention, a schedule script can be easily read and written by realizing it using a standard markup language. In addition, since a schedule script is basically text data, the capacity of a storage medium can be small, and the execution according to an instruction can be easily realized.

Using various types of devices and media, at the same or different times, or in the same or different places, various users can use schedule management services online or offline.

A schedule script can be executed, converted, generated, edited, analyzed, coupled, changed, amended, copied, deleted, stored, and retrieved. It also can be stored as a database for reuse. In addition, a schedule script can be carried or transferred by appropriate electronic media and networks. A schedule script can be sold, purchased, issued, received, given, obtained, thrown away, picked up, value-added. Practically, a schedule script can be generated and provided by a schedule script center, a contents provider, a person, an organization, and any others.

A schedule script generated by a personal computer (PC), a car navigation system, a PDA, a cellular phone, etc. can be written to an IC card and a prepaid card. In addition, the schedule script written onto an IC card and a prepaid card can be read to a PC, car navigation system, PDA, cellular phone, etc. to execute an instruction for a schedule management system.

A schedule management received by a PC, car navigation system, PDA and the cellular phone can be switched to another PC, car navigation system, PDA, cellular phone, etc. to continuously receive schedule management. For example, even if a user who receives schedule management while moving on foot using a cellular phone transfers to a car, the same schedule management can be continuously received from the car navigation system by commonly using the same schedule script.

A method of presenting a schedule to a user can be written.

A schedule script can be shared among a number of users. Thus, an action can be performed based on the same schedule at a remote place.

Since a user schedule can be referred to by a machine, a process such as performing an action beforehand, etc. can be executed.

As a normal schedule management system, the present invention can be used in preventing daily operations from being forgotten, and in self-management.

What is claimed is:

1. An apparatus which presents a schedule to a user depending on a situation, comprising:
   an input device inputting a schedule comprising a sequence of instructions based on a predetermined specification capable of describing one of the instructions by a combination of at least place information, time information, a schedule to be performed according to the place information and the time information, and a method of presenting the user with the schedule;
   a device performing one of obtaining a situation of a current place and a current time, and generating a situation of a virtual current place and a virtual current time;
   a process device executing an instruction described in the input schedule depending on the current place and the current time obtained by one of obtaining the situation and generating the situation; and
   a presentation device presenting a schedule according to the executed instruction.

2. The apparatus according to claim 1, further comprising a device suggesting and performing an action corresponding to the schedule, wherein
   said input device inputs a schedule containing a method of suggesting and performing the action.

3. The apparatus according to claim 2, wherein
   said schedule is described in a markup language which identifies using a tag the place information, the time information, the schedule to be performed, the method of presenting the user with the schedule, the method of suggesting and performing the action corresponding the schedule, and other components of the instructions.

4. The apparatus according to claim 2, wherein
   said process device executes an instruction when said place information corresponds to one of the current place of the user and the virtual current place and said time information corresponds to one of the current time and the virtual current time.

5. The apparatus according to claim 2, wherein
   said input device inputs a user-specified schedule by one of communicating with an external device for providing a schedule through a network, reading from a computer-readable electronic medium, and inputting a schedule by the user.

6. The apparatus according to claim 2, further comprising:
   a conversion device analyzing the input schedule and converting the schedule into structured data for schedule management, wherein
   said process device executes an instruction represented in a form of the structured data for schedule management.

7. An apparatus which presents a schedule to a user depending on a situation, comprising:
   an input device inputting a schedule comprising a sequence of instructions based on a predetermined specification capable of describing place information, time information, and a method of presenting a schedule to be processed according to a place and a time corresponding to the place information and the time information, using a combination of a name identifying each of the place information, the time information, and the method of presenting the schedule, and contents of each of the place information, the time information, and the method of presenting the schedule;
   a setting device setting as an operation mode one of a real mode and a simulation mode, by one of inputting an operation by the user and setting by a system;
   an obtaining device obtaining a situation of a current time and a current place in the real mode;
   a generation device generating a situation of a virtual current time and a virtual current place in the simulation mode;
   a process device executing an instruction described in the input schedule depending on the current place and the current time obtained by obtaining the situation in the real mode and depending on the virtual current place and the virtual current time obtained by generating the situation in the simulation mode; and
   a presentation device presenting a schedule according to the executed instruction.

8. The apparatus according to claim 7, further comprising
   a device suggesting and performing an action corresponding to the schedule, wherein
   said input device inputs a schedule containing a method of suggesting and performing the action.

9. A method of presenting a schedule to a user depending on a situation, comprising:
   inputting a schedule comprising a sequence of instructions based on a predetermined specification capable of describing one of the instructions by a combination of at least place information, time information, a method of presenting a schedule to be executed according to a place and a time corresponding to the place information and the time information, and a method of suggesting and performing an action corresponding to the schedule, using a combination of a name identifying a type of each piece of information and contents of the information, by one of communicating through a network, reading from an electronic medium, and inputting by the user;
   performing one of obtaining a situation of a current place and a current time and generating a situation of a virtual current place and a virtual current time;
   executing an instruction described in the input schedule depending on the current time and current place obtained by one of obtaining the situation and generating the situation; and
   performing one of presenting a schedule, and suggesting and performing an action corresponding to the schedule, according to the executed instruction.

10. A method of presenting a schedule to a user depending on a situation, comprising:
    inputting a schedule comprising a sequence of instructions based on a predetermined specification capable of describing place information, time information, a method of presenting a schedule to be processed according to a place and a time corresponding to the place information and the time information, and a method of suggesting and performing an action corresponding to the schedule, using a combination of a name identifying each of the place information, the time information, and the method of presenting the schedule, and contents of each of the place information, the time information, and the method of presenting the schedule;

setting as an operation mode one of a real mode and a simulation mode, by one of inputting an operation by the user and setting by a system;

obtaining a situation of a current time and a current place in the real mode, and generating a situation of a virtual current time and a virtual current place in the simulation mode;

executing an instruction described in the input schedule depending on the current place and the current time obtained by obtaining the situation in the real mode and depending on the virtual current place and the virtual current time obtained by generating the situation in the simulation mode; and performing one of presenting a schedule, and suggesting and performing an action corresponding to the schedule, according to the executed instruction.

11. A storage medium storing a program for a computer presenting a schedule to a user depending on a situation, said program enabling the computer to perform:

inputting a schedule comprising a sequence of instructions based on a predetermined specification capable of describing one of the instructions by place information, time information, a method of presenting a schedule to be executed according to a place and a time corresponding to the place information and the time information, and a method of suggesting and performing an action corresponding to the schedule, using a combination of a name identifying a type of each piece of information and contents of the information, by one of communicating through a network, reading from an electronic medium, and inputting by the user;

performing one of obtaining a situation of a current place and a current time and generating a situation of a virtual current place and a virtual current time;

executing an instruction described in the input schedule depending on the current time and current place obtained by one of obtaining the situation and generating the situation; and performing one of presenting a schedule, and suggesting and performing an action corresponding to the schedule, according to the executed instruction.

12. A storage medium storing a program for a computer presenting a schedule to a user depending on a situation, said program enabling the computer to perform:

inputting a schedule comprising a sequence of instructions based on a predetermined specification capable of describing place information, time information, a method of presenting a schedule to be processed according to a place and a time corresponding to the place information and the time information, and a method of suggesting and performing an action corresponding to the schedule, using a combination of a name identifying each of the place information, the time information, the method of presenting of schedule, and the method of suggesting and performing the action, and contents of each of the place information, the time information, the method of presenting of schedule, and the method of suggesting and performing the action;

setting as an operation mode one of a real mode and a simulation mode, by one of inputting an operation by the user and setting by a system;

obtaining a situation of a current time and a current place in the real mode, and generating a situation of a virtual current time and a virtual current place in the simulation mode;

processing an instruction described in the input schedule depending on the current place and the current time obtained by obtaining the situation in the real mode and depending on the virtual current place and the virtual current time obtained by generating the situation in the simulation mode; and performing one of presenting a schedule, and suggesting and performing an action corresponding to the schedule, according to a process of the instruction.

13. A computer-readable storage medium for a computer presenting a schedule to a user depending on a situation, storing schedule data:

wherein said schedule data comprise an electronic code string described in a markup language based on a predetermined specification, said code string including a sequence of instructions based on a predetermined specification capable of describing place information, time information, a method of presenting a schedule to be processed according to a place and a time corresponding to the place information and the time information, and a method of suggesting and performing an action corresponding to the schedule, using a combination of a name identifying each of the place information, the time information, the method of presenting of schedule, and the method of suggesting and performing the action, and contents of each of the place information, the time information, the method of presenting the schedule, and the method of suggesting and performing the action; and wherein said schedule data are read and used by the computer for presenting a schedule to the user, and suggesting and performing an action corresponding to the schedule accoding to the instructions.

14. An automatic schedule generation apparatus which automatically generates a schedule to be presented to a user depending on a situation, comprising:

a device obtaining a situation of a current time and a current place one of at predetermined time intervals, at predetermined places, at predetermined distances, at each matching item in a prepared user action list, for each characteristic user action, and for a user instruction;

a device estimating a user action performed when the situation is obtained, and determining a schedule and one of a method of presenting the schedule to the user depending on the schedule and a method of suggesting and performing an action depending on the schedule;

a device generating schedule data comprising a sequence of instructions based on a predetermined specification capable of describing place information, time information, a method of presenting the schedule to be processed according to a place and a time corresponding to the place information and the time information, and a method of suggesting and performing an action corresponding to the schedule, using a combination of a name identifying each of the place information, the time information, the method of presenting the schedule, and the method of suggesting and performing the action, and contents of each of the place information, the time information, the method of presenting the schedule, and the method of suggesting and performing the action, according to information about the determined schedule; and a device storing generated schedule data in an electronic medium.

15. A schedule presentation apparatus which presents a user with information corresponding to a schedule, comprising:

an input device inputting data comprising a sequence of a predetermined specification capable of describing the sequence by a combination of a place condition, a time condition, and a schedule to be performed based on the place condition and time condition; and a process device processing the schedule described in the input data using the place condition and time condition depending on a range of place information and a range of time information to be presented to the user.

16. The apparatus according to claim 15, further comprising a display device displaying the schedule described in the input data together with the place condition on a map corresponding to the range of the place information.

17. The apparatus according to claim 16, wherein said display device displays the schedule when a range of the place condition is contained in a display range of the map.

18. The apparatus according to claim 16, wherein said display device displays an order of executing a plurality of schedules when the plurality of schedules having a series of place conditions are displayed on the map, by sequentially connecting the plurality of schedules using lines.

19. The apparatus according to claim 15, further comprising a display device displaying a map corresponding to the range of the place information and a time axis schedule table corresponding to the range of the time information, and displaying the schedule described in the input data on the map together with the place condition, and on the time axis schedule table together with the time condition when a range of the place condition is contained in a display range of the map and a range of the time condition is contained in a display range of the time axis schedule table.

20. A schedule presentation apparatus which presents a user with information corresponding to a schedule, comprising:

an input device inputting data comprising a sequence of a predetermined specification capable of describing the sequence by a combination of a place condition, a time condition, a schedule to be performed based on the place condition and time condition, and a method of presenting a user with presentation information for the schedule; and a process device processing at least one of the schedule described in the input data and the presentation information for the schedule using the place condition, the time condition, and the method of presenting, depending on a range of a place information and a range of a time information to be presented to a user.

21. A schedule presentation apparatus which presents a user with information corresponding to a schedule, comprising:

an input device inputting data comprising a sequence of a predetermined specification capable of describing the sequence by a combination of a place condition, a time condition, a schedule to be performed based on the place condition and time condition, and a method of presenting a user with presentation information for the schedule;

a device performing one of obtaining a situation of a current place and a current time, and generating a situation of a virtual current place and a virtual current time; and a process device processing at least one of the schedule described in the input data and the presentation information for the schedule using the place condition, the time condition, and the method of presenting, depending on the current place and the current time obtained by one of obtaining the situation and generating the situation.

22. The apparatus according to claim 21, further comprising a display device displaying a map, and displaying on the map at least one of the schedule described in the input data and the presentation information for the schedule, together with the place condition.

23. The apparatus according to claim 22, wherein said display device changes a display range of the map as the current place moves, and displays a schedule having a place condition contained in the changed display range.

24. A schedule presentation apparatus which presents a user with information corresponding to a schedule, comprising:

an input device inputting data comprising a sequence of a predetermined specification capable of describing the sequence by a combination of a place condition, a time condition, a schedule to be performed based on the place condition and time condition, a method of presenting a user with presentation information for the schedule, and an action to be performed for the schedule;

a device performing one of obtaining a situation of a current place and a current time, and generating a situation of a virtual current place and a virtual current time; and a process device processing at least one of the schedule described in the input data and the presentation information for the schedule using the place condition, the time condition, and the method of presenting, depending on the current place and the current time obtained by one of obtaining the situation and generating the situation; and an execution device performing the action to be performed for the schedule described in the input data using the place condition and time condition, depending on the current place and the current time obtained by one of obtaining the situation and generating the situation.

25. A schedule presentation apparatus which presents a user with information corresponding to a schedule, comprising:

input means for inputting data comprising a sequence of a predetermined specification capable of describing the sequence by a combination of a place condition, a time condition, and a schedule to be performed based on the place condition and time condition; and process means for processing the schedule described in the input data using the place condition and time condition, depending on a range of place information and a range of time information to be presented to the user.

26. A schedule presentation apparatus which presents a user with information corresponding to a schedule, comprising:

input means for inputting data comprising a sequence of a predetermined specification capable of describing the sequence by a combination of a place condition, a time condition, a schedule to be performed based on the place condition and time condition, and a method of presenting the user with presentation information for the schedule;

means for performing one of obtaining a situation of a current place and a current time, and generating a situation of a virtual current place and a virtual current time; and process means for processing at least one of the schedule described in the input data and the presentation information for the schedule using the place condition, the time condition, and the method of presenting, depending on the current place and the current time obtained by one of obtaining the situation and generating the situation.

\* \* \* \* \*

UNITED STATES PATENT AND TRADEMARK OFFICE
CERTIFICATE OF CORRECTION

PATENT NO. : 6,925,603 B1
APPLICATION NO. : 09/654524
DATED : August 2, 2005
INVENTOR(S) : Hirohisa Naito et al.

Page 1 of 1

It is certified that error appears in the above-identified patent and that said Letters Patent is hereby corrected as shown below:

First Page, Col. 2, line 7 (Other Publications), Change "'Online!," to --'Online,--.

First Page, Col. 2, line 8 (Other Publications), insert --<-- after "Internet:".

First Page, Col. 2, line 1 (Attorney, Agent, or Firm), insert --LLP-- after "Halsey".

Col. 27, line 25, insert --of-- after "combination" and delete "by" (second occurrence).

Col. 30, line 44, change "accoding" to --according--.

Signed and Sealed this

First Day of August, 2006

JON W. DUDAS
*Director of the United States Patent and Trademark Office*